(12) United States Patent
Hu et al.

(10) Patent No.: US 12,280,310 B2
(45) Date of Patent: Apr. 22, 2025

(54) VIRTUAL OBJECT CONTROL METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Xun Hu, Shenzhen (CN); Jianmiao Weng, Shenzhen (CN); Yulin Wan, Shenzhen (CN); Shandong Su, Shenzhen (CN); Yong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 378 days.

(21) Appl. No.: 17/530,382

(22) Filed: Nov. 18, 2021

(65) Prior Publication Data
US 2022/0072428 A1 Mar. 10, 2022

Related U.S. Application Data

(63) Continuation of application No. PCT/CN2021/079592, filed on Mar. 8, 2021.

(30) Foreign Application Priority Data

Apr. 23, 2020 (CN) .......................... 202010328506.0

(51) Int. Cl.
*A63F 13/56* (2014.01)
*A63F 13/537* (2014.01)
*A63F 13/58* (2014.01)

(52) U.S. Cl.
CPC ............ *A63F 13/56* (2014.09); *A63F 13/537* (2014.09); *A63F 13/58* (2014.09)

(58) Field of Classification Search
CPC ...... A63F 13/822; A63F 13/58; A63F 13/537; A63F 13/56
See application file for complete search history.

(56) References Cited

U.S. PATENT DOCUMENTS

| 10,960,305 B2 * | 3/2021 | Hisaoka ............... A63F 13/822 |
| 2002/0103031 A1 * | 8/2002 | Neveu ................... A63F 13/537 463/49 |

(Continued)

FOREIGN PATENT DOCUMENTS

| CN | 107398071 A | 11/2017 |
| CN | 107583271 A | 1/2018 |

(Continued)

OTHER PUBLICATIONS

The European Patent Office (EPO) The Extended European Search Report for 21778333.1 Jun. 9, 2022 9 Pages (including translation).

(Continued)

*Primary Examiner* — Jay Trent Liddle
(74) *Attorney, Agent, or Firm* — ANOVA LAW GROUP PLLC

(57) ABSTRACT

A virtual object control method is provided. The method includes: displaying a battle interface, the battle interface including a first virtual object, at least one second virtual object, and a first control; determining a target virtual object from the at least one second virtual object, and labeling the target virtual object in a predetermined manner; receiving a first trigger signal acting on the first control; and controlling, in response to determining that the first trigger signal meets an automatic control condition, the first virtual object to use a virtual prop to change a target attribute value of the target virtual object.

19 Claims, 14 Drawing Sheets

(56) References Cited

U.S. PATENT DOCUMENTS

| | | | | |
|---|---|---|---|---|
| 2006/0160592 | A1* | 7/2006 | Endo | A63F 13/10 463/8 |
| 2010/0009733 | A1 | 1/2010 | Garvin et al. | |
| 2014/0274239 | A1* | 9/2014 | Han | A63F 13/5372 463/2 |
| 2016/0256777 | A1* | 9/2016 | Umebayashi | A63F 13/00 |
| 2017/0072317 | A1* | 3/2017 | Nishikawa | A63F 13/56 |
| 2017/0095737 | A1* | 4/2017 | Nishikawa | A63F 13/822 |
| 2017/0361230 | A1* | 12/2017 | Tang | A63F 13/422 |
| 2020/0054947 | A1* | 2/2020 | Wu | A63F 13/537 |
| 2020/0139239 | A1* | 5/2020 | Lee | A63F 13/69 |
| 2020/0164272 | A1* | 5/2020 | Inaba | A63F 13/44 |
| 2020/0235984 | A1* | 7/2020 | Takeuchi | H04L 41/06 |

FOREIGN PATENT DOCUMENTS

| | | | |
|---|---|---|---|
| CN | 107837529 | A | 3/2018 |
| CN | 108310771 | A | 7/2018 |
| CN | 109865282 | A | 6/2019 |
| CN | 110064193 | A | 7/2019 |
| CN | 110141864 | A | 8/2019 |
| CN | 110368691 | A | 10/2019 |
| CN | 110413171 | A | 11/2019 |
| CN | 110448891 | A | 11/2019 |
| CN | 110743168 | A | 2/2020 |
| CN | 111589126 | A | 8/2020 |
| JP | H08229238 | A | 9/1996 |
| JP | 3685836 | B2 | 8/2005 |
| JP | 2017012423 | A | 1/2017 |
| WO | 2019044131 | A1 | 3/2019 |

OTHER PUBLICATIONS

The World Intellectual Property Organization (WIPO) International Search Report for PCT/CN2021/079592 Jun. 8, 2021 7 Pages (including translation).

The State Intellectual Property Office of the People's Republic of China (SIPO) Office Action 1 for for 202010328506.0 Mar. 26, 2021 11 Pages (including translation).

The State Intellectual Property Office of the People's Republic of China (SIPO) Office Action 2 for for 202010328506.0 Oct. 15, 2021 9 Pages (including translation).

Suo Wei Kong Ju, "[King of Glory] beginners' slide release skills," bilibili.com, Oct. 6, 2017, Retrieved from the Internet:URL: https://www.bilibili.com/video/BV1Bx41137G2?from=search&seid=17488764798763891656. 7 pages.

Admin "How to set the skill release of [King of Glory]," anfensi.com, May 29, 2018, Retrieved from the Internet:URL: http://www.anfensi.com/news/157809.html, [retrieved on Sep. 28, 2021]. 8 pages.

Zi Xin Xiao Fei, "[King of Glory Miyamoto Musashi] Super detailed explanation of skills, yes, I am the most "fine" man in the entire network," bilibili.com, Apr. 19, 2020, Retrieved from the Internet: URL: https://www.bilibili.com/video/BV1NK4y1k7Ls?from=search&seid=11878933809390051270&spm_id_from=333.337.0.0. 6 pages.

China National Intellectual Property Administration (CNIPA) Office Action 1 for 202010328506.0 Oct. 25, 2022 21 Pages (including translation).

""Vanity" Joystick Operation Demonstration", May 20, 2018, https://v.qq.com/x/page/e0659p8orzp.html.

Japan Patent Office (JPO) The Office Action For JP Application No. 2021-566600 Dec. 6, 2022 11 Pages (Translation Included).

"Screen operation King of Glory, Wiki Guides", Jul. 24, 2022,http://oujyaeiyo.xyz/beginner/screenoperation.

[King of Glory] Beginner's sliding release skill, <https://www.bilibili.com/video/BV1Bx41137G2/?from=search&seid=17488764798763891656>, Oct. 16, 2017. 2 pages (including translation).

Admin: How to set up skill release in "Honor of Kings", <www.anfensi.com/news/157809.html>, May 29, 2018 9 Pages (including translation).

King Operations Team: "[Planning Breaking News] Last-hitting attack-accurately select the target to attack", <https://pvp.qq.com/webplat/info/news_version3/15592/24091/24092/24095/m15241/201605/459663.shtml>, May 3, 2016. 6 Pages (including translation).

Korean Intellectual Property Office (KIPO) Office Action 1 for 20217035074 Sep. 18, 2023 23 Pages (including translation).

Korean Intellectual Property Office (KIPO) Office Action 1 for 20217035074 Apr. 23, 2024 29 Pages (including translation).

How to set up skill release in "Glory of the King"?, May 29, 2018 (May 29, 2018), http://www.anfensi.com/news/157809.html.

[Planning Tips] Last Hit Key Attack—Accurately Select Attack Target, May 3, 2016 (May 3, 2016), https://pvp.qq.com/webplat/info/new_version3/15592/24091/24092/24095/m15241/201605/459663.shtml.

* cited by examiner

VIRTUAL OBJECT CONTROL METHOD AND APPARATUS, DEVICE, AND STORAGE MEDIUM

RELATED APPLICATION(S)

This application is a continuation application of PCT Patent Application No. PCT/CN2021/079592 filed on Mar. 8, 2021, which claims priority to Chinese Patent Application No. 202010328506.0, filed on Apr. 23, 2020 and entitled "VIRTUAL OBJECT CONTROL METHOD AND APPARATUS, DEVICE, AND STORAGE MEDIUM", all of which are incorporated herein by reference in entirety.

FIELD OF THE TECHNOLOGY

The present disclosure relates to the field of computer technologies, and in particular, to a virtual object control method and apparatus, a device, and a storage medium.

BACKGROUND

In an application based on a two-dimensional or three-dimensional virtual environment, for example, a multiplayer online battle arena (MOBA) game, users can cast skills to other virtual objects, virtual buildings, and the like by controlling virtual objects in a virtual scene, and contend against each other using a specific victory condition as a goal.

A user may cast a skill to a virtual object by clicking a skill control. The virtual object is a default virtual object determined by a server according to data of a client, or the user may actively select a virtual object by dragging the skill control and cast the skill. During skill casting, a presentation layer of an application performs special labeling on the virtual object to which the skill is cast, and displays the virtual object in a virtual environment picture.

However, by performing special labeling on a virtual object during skill casting, a user may only determine whether an object to which a skill is cast is an expected virtual object during skill casting, and may not learn a virtual object corresponding to the skill before skill casting, which may cause the skill to be cast to a wrong object, resulting in a waste of skill resources.

SUMMARY

Embodiments of the present disclosure provide a virtual object control method and apparatus, a device, and a storage medium, to enable a user to learn, through labeling when an operation has not performed, a target virtual object on which the operation acts, thereby improving control efficiency and control accuracy for a virtual object. The technical solutions are as follows:

In one aspect, the present disclosure provides a virtual object control method, applied to a terminal, the method including: displaying a battle interface, the battle interface including a first virtual object, at least one second virtual object, and a first control, the first virtual object and the second virtual object being located in a virtual world and belonging to different camps, and the first control being configured to control the first virtual object to use a virtual prop to change target attribute values of other virtual objects; determining a target virtual object from the at least one second virtual object, and labeling the target virtual object in a predetermined manner; receiving a first trigger signal acting on the first control; and controlling, when or in response to determining that the first trigger signal meets an automatic control condition, the first virtual object to use the virtual prop to change a target attribute value of the target virtual object.

In another aspect, the present disclosure provides a virtual object control apparatus, including: a memory storing computer program instructions; and a processor coupled to the memory and configured to execute the computer program instructions and perform: displaying a battle interface, the battle interface including a first virtual object, at least one second virtual object, and a first control, the first virtual object and the second virtual object being located in a virtual world and belonging to different camps, and the first control being configured to control the first virtual object to use a virtual prop to change target attribute values of other virtual objects; determining a target virtual object from the at least one second virtual object, and label the target virtual object in a predetermined manner; receiving a first trigger signal acting on the first control; and controlling, in response to determining that the first trigger signal meets an automatic control condition, the first virtual object to use the virtual prop to change a target attribute value of the target virtual object.

In yet another aspect, the present disclosure provides a non-transitory computer-readable storage medium storing computer program instructions executable by at least one processor to perform: displaying a battle interface, the battle interface including a first virtual object, at least one second virtual object, and a first control, the first virtual object and the at least one second virtual object being located in a virtual world and belonging to different camps, and the first control being configured to control the first virtual object to use a virtual prop to change target attribute values of other virtual objects; determining a target virtual object from the at least one second virtual object, and labeling the target virtual object in a predetermined manner; receiving a first trigger signal acting on the first control; and controlling, in response to determining that the first trigger signal meets an automatic control condition, the first virtual object to use the virtual prop to change a target attribute value of the target virtual object.

The technical solutions provided in the embodiments of the present disclosure include at least the following beneficial effects:

In the embodiments of the present disclosure, a target virtual object in a battle interface is labeled in a predetermined manner, and when a first trigger signal meeting an automatic control condition and acting on a first control is received, a first virtual object is controlled to change a target attribute value of the target virtual object; and the target virtual object is labeled before the first virtual object is controlled to change the target attribute value of the target virtual object. Therefore, a user can learn, through labeling when an operation has not been performed, a target virtual object on which the operation acts. If the target virtual object does not match an expected object, the target virtual object can be changed through another operation; and if the target virtual object matches the expected object, the operation may be quickly performed by using the first control, thereby improving control efficiency and control accuracy for a virtual object. In addition, a task to confirm and label an operation object in a process of performing the operation can be avoided, so as to reduce an operation execution delay, thereby improving man-machine interaction efficiency.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
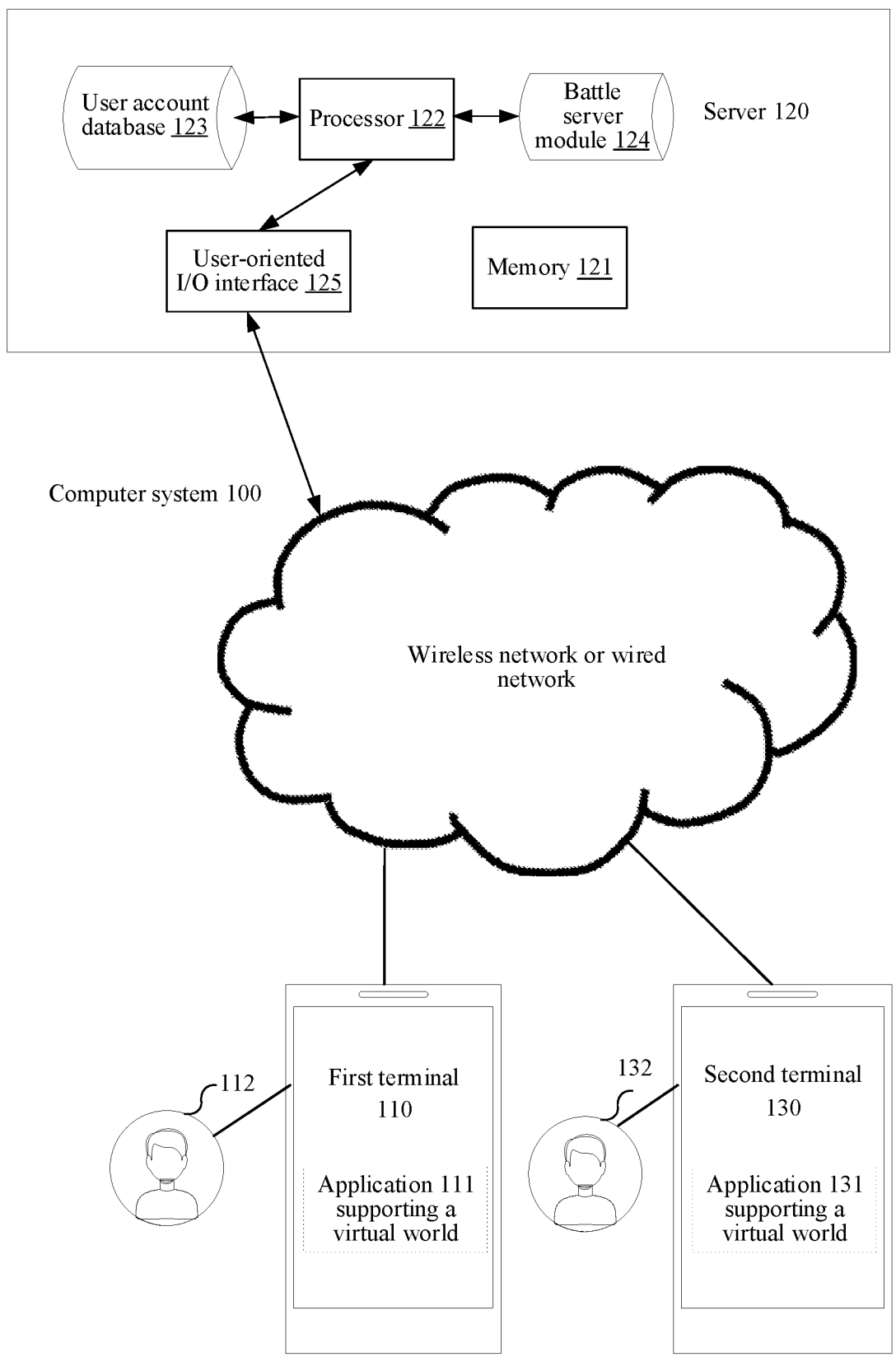
FIG. 1 is a schematic diagram of an implement environment according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

In certain embodiments, the term "a plurality of" refers to a quantity of two or more. In certain embodiments, the term "and/or" refers to association relationships for associated objects and represents that three relationships may exist. For example, A and/or B may represent the following three situations: only A exists, both A and B exist, and only B exists. The character "/" generally indicates an "or" relationship between the associated objects.

Terms involved in the embodiments of the present disclosure are briefly introduced as follows:

Virtual world: It is a world displayed (provided) by an application when running on a terminal. The virtual world may be a simulated world of a real world, or may be a semi-simulated semi-fictional three-dimensional world, or may be an entirely fictional three-dimensional world. The virtual world may be any one of a two-dimensional virtual world, a 2.5-dimensional virtual world, and a three-dimensional virtual world. In certain embodiments, the virtual world is further used for a virtual world battle between at least two virtual objects, and virtual resources available to the at least two virtual objects are provided in the virtual world. In certain embodiments, the virtual world includes a lower left corner region and an upper right corner region that are symmetrical. Virtual objects belonging to two opposing camps occupy the regions respectively, and the objective of each side is to destroy a target building/fort/base/crystal deep in the opponent's region to win victory.

Virtual object: It is a movable object in a virtual world. The movable object may be at least one of a virtual person, a virtual animal, and a cartoon person. In certain embodiments, when a virtual world is a three-dimensional virtual world, the virtual objects may be three-dimensional models. Each virtual object has a shape and a volume in the three-dimensional virtual world, and occupies some space in the three-dimensional virtual world. In certain embodiments, the virtual object is a three-dimensional character constructed based on three-dimensional human skeleton technology. The virtual object wears different skins to implement different appearances. In some implementations, the virtual object may be alternatively implemented by using a 2.5-dimensional model or a two-dimensional model. This is not limited in the embodiments of the present disclosure.

MOBA game: It is a game in which different virtual teams on at least two opposing camps occupy respective map regions in a virtual world, and contend against each other using a specific victory condition as a goal. The victory conditions include, but are not limited to at least one of occupying forts or destroy forts of the opposing camps, killing virtual objects in the opposing camps, ensure own survivals in a specified scenario and time, seizing a specific resource, and outscoring the opponent within a specified time. The battle arena game may take place in rounds. The same map or different maps may be used in different rounds of the battle arena game. Each virtual team includes one or more virtual objects, for example, 1 virtual object, 2 virtual objects, 3 virtual objects, or 5 virtual objects.

Virtual prop: It is a prop that a virtual object can use in a virtual environment, including a virtual weapon such as a pistol, a rifle, a sniper rifle, a dagger, a knife, a sword, an axe, or a rope that can cause damage to another virtual object, a supply prop such as bullets, a defensive prop such as a shield, an armor, or an armored vehicle, a virtual prop such as a virtual beam or a virtual shock wave shown through a hand when being used for casting a skill by the virtual object, and a body part of the virtual object, such as a hand or a leg. In certain embodiments, the virtual prop in the embodiments of the present disclosure refers to a prop equipped on a virtual object by default.

A user interface (UI) control: It is any visual control or element that can be seen in a UI of an application, for example, a control such as a picture, an input box, a text box, a button, or a label. Some UI controls respond to an operation of a user.

FIG. 1 is a schematic diagram of an implementation environment according to an embodiment of the present disclosure. The implementation environment may include: a first terminal 110, a server 120, and a second terminal 130.

An application 111 supporting a virtual world is installed and run on the first terminal 110, and the application 111 may be a multiplayer online battle program. When the first terminal runs the application 111, a UI of the application 111 is displayed on a screen of the first terminal 110. The application 111 may be any one of a military simulation program, a MOBA game, a battle royale shooting game, and a simulation game (SLG). In this embodiment, an example in which the application 111 is a MOBA game is used for description. The first terminal 110 is a terminal used by a first user 112. The first user 112 uses the first terminal 110 to control a first virtual object located in the virtual world to perform activities, and the first virtual object may be referred to as a main control virtual object of the first user 112. The activities of the first virtual object include, but are not limited to: at least one of adjusting body postures, crawling, walking, running, riding, flying, jumping, driving, picking, shooting, attacking, throwing, and skill casting. For example, the first virtual object is a first virtual person such as a simulated person or a cartoon person.

An application 131 supporting a virtual world is installed and run on the second terminal 130, and the application 131 may be a multiplayer online battle program. When the second terminal 130 runs the application 131, a UI of the application 131 is displayed on a screen of the second terminal 130. The application may be any one of a military simulation program, a MOBA game, a battle royale shooting game, and an SLG. In this embodiment, an example in which the application 131 is a MOBA game is used for description. The second terminal 130 is a terminal used by a second user 132. The second user 132 uses the second terminal 130 to control a second virtual object located in the virtual world to perform activities, and the second virtual object may be referred to as a main control virtual object of the second user 132. For example, the second virtual object is a second virtual person, such as a simulated person or a cartoon person.

In certain embodiments, the first virtual object and the second virtual object are located in the same virtual world. In certain embodiments, the first virtual object and the second virtual object may belong to the same camp, the same team, or the same organization, have a friend relationship with each other, or have a temporary communication permission. In certain embodiments, the first virtual object and the second virtual object may belong to different camps, different teams, or different organizations, or have a hostile relationship with each other.

In certain embodiments, the applications installed on the first terminal 110 and the second terminal 130 are the same, or the applications installed on the two terminals are the same type of applications on different operating system platforms (Android system or iOS system). The first terminal 110 may generally refer to one of a plurality of terminals, and the second terminal 130 may generally refer to another one of the plurality of terminals. In this embodiment, only the first terminal 110 and the second terminal 130 are used as an example for description. The first terminal 110 and the second terminal 130 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer.

FIG. 1 shows only two terminals. However, a plurality of other terminals may access the server 120 in different embodiments. In certain embodiments, one or more terminals are terminals corresponding to a developer. A developing and editing platform for the application supporting a virtual world is installed on the terminal. The developer may edit and update the application on the terminal and transmit an updated application installation package to the server 120 by using a wired or wireless network. The first terminal 110 and the second terminal 130 may download the application installation package from the server 120 to update the application.

The first terminal 110, the second terminal 130, and the another terminal are connected to the server 120 through a wireless network or a wired network.

The server 120 includes at least one of one server, a server cluster including a plurality of servers, a cloud computing platform, and a virtualization center. The server 120 is configured to provide a backend service for an application supporting a three-dimensional virtual world. In certain embodiments, the server 120 takes on primary computing work, and the terminals take on secondary computing work. Alternatively, the server 120 takes on secondary computing work, and the terminals take on primary computing work. Alternatively, collaborative computing is performed by using a distributed computing architecture between the server 120 and the terminals.

In a schematic example, the server 120 includes a memory 121, a processor 122, a user account database 123, a battle service module 124, and a user-oriented input/output (I/O) interface 125. The processor 122 is configured to load instructions stored in the server 120, and process data in the user account database 123 and the battle service module 124. The user account database 123 is used for storing data of user accounts used by the first terminal 110, the second terminal 130, and/or the another terminal, for example, profile pictures of the user accounts, nicknames of the user accounts, combat power indices of the user accounts, and service regions in which the user accounts are located. The battle service module 124 is configured to provide a plurality of battle rooms to users for a battle, for example, a 1V1 battle, a 3V3 battle, or a 5V5 battle. The user-oriented I/O interface 125 is configured to establish communication with the first terminal 110 and/or the second terminal 130 by using a wireless network or wired network to exchange data.

Figure 2:
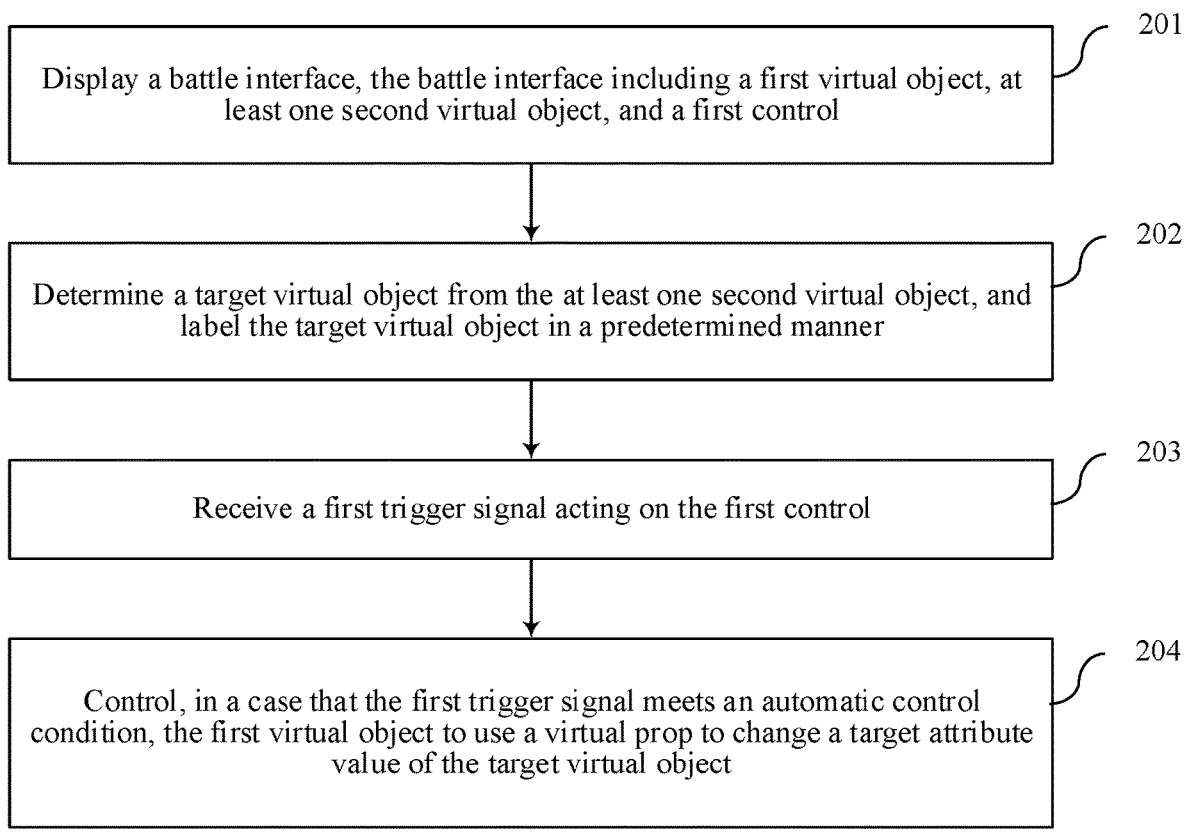
FIG. 2 is a schematic flowchart of a virtual object control method according to one or more embodiments of the present disclosure.

FIG. 2 is a flowchart of a virtual object control method according to an exemplary embodiment of the present disclosure. This embodiment is described by using an example in which the method is applied to a first terminal 110 or a second terminal 130 in an implementation environment shown in FIG. 1 or another terminal in the implementation environment. The method includes the following steps:

Step 201: Display a battle interface, the battle interface including a first virtual object, at least one second virtual object, and a first control.

The first virtual object and the second virtual object are located in a virtual world and belong to different camps, and the first control is configured to control the first virtual object to use a virtual prop to change target attribute values of other virtual objects.

In certain embodiments, the battle interface includes a virtual world picture and a control layer on the virtual world picture. The virtual world picture includes a first virtual object and at least one second virtual object. The first virtual object is a virtual object belonging to a first camp, the second virtual object is a virtual object belonging to a second camp, and the first virtual object and the second virtual object are hostile to each other. For example, the second virtual objects include a virtual object controlled by another terminal in the second camp and virtual objects in the second camp that are controlled by a server such as a soldier and a virtual building that can be conquered that are controlled by the server.

In certain embodiments, the second virtual objects further include virtual objects belonging to a third camp. The third camp is controlled by the server, and the virtual object may be, for example, a monster in the virtual world.

For example, the virtual world has any boundary shape, and the first virtual object is within a visual range of the battle interface. In certain embodiments, the first virtual object is located in a visual center of the virtual world picture, that is, located in a center of a virtual world picture obtained by observing the virtual world from a third-person perspective.

Perspective refers to an observation angle at which observation is performed in a virtual world from a first-person perspective or a third-person perspective of a virtual character. In certain embodiments, in the embodiments of the present disclosure, the perspective is an angle for observing a virtual character by using a camera model in the virtual world. In certain embodiments, the camera model automatically follows the virtual object in the virtual world. That is, when a position of the virtual object in the virtual world changes, a position of the camera model following the virtual object in the virtual world changes simultaneously, and the camera model is always within a preset distance range of the virtual object in the virtual world. In certain embodiments, in the automatic following process, relative positions of the camera model and the virtual object remain unchanged. The embodiments of the present disclosure are described by using the third-person perspective as an example. In certain embodiments, the camera model is located behind the virtual object (for example, the head and the shoulders of a virtual person).

In certain embodiments, the control layer of the battle interface includes a first control configured to control the first virtual object to use a virtual prop to change target attribute values of other virtual objects. For example, the first control is configured to control a basic operation of the first virtual object, and may alternatively be referred to as an ordinary attack control.

Figure 3:
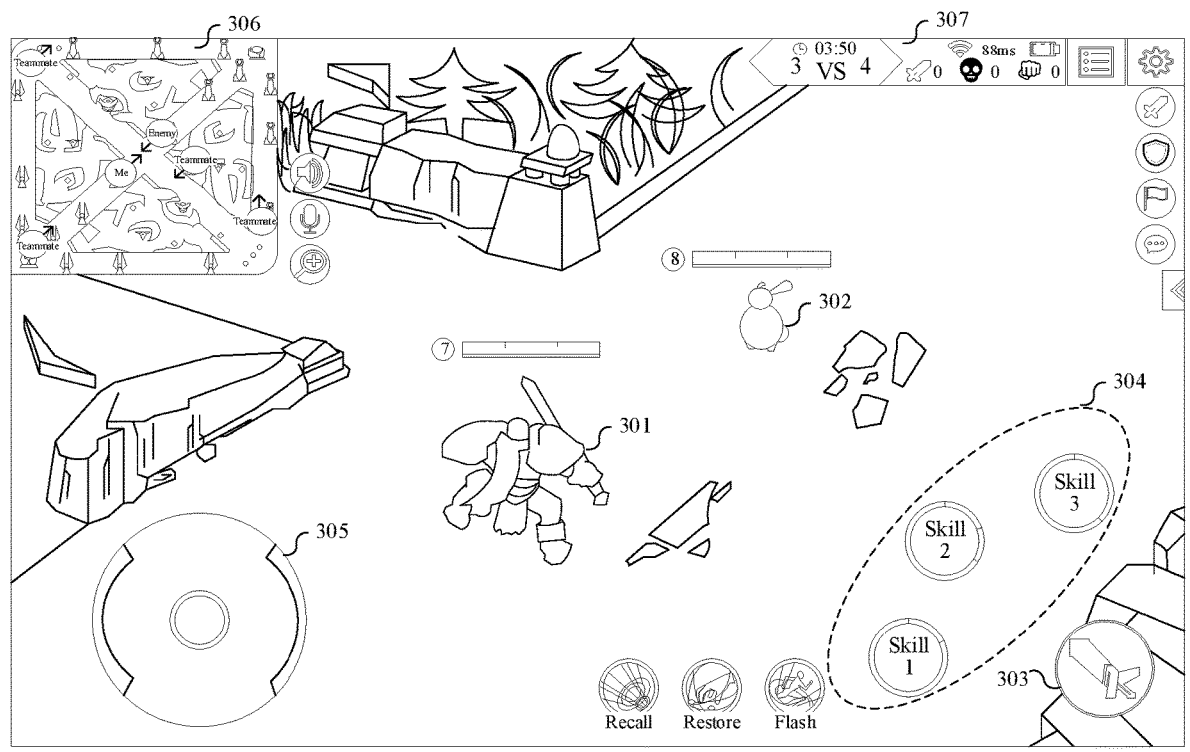
FIG. 3 is a schematic diagram of a battle interface according to one or more embodiments of the present disclosure.

For example, FIG. 3 shows a battle interface. A virtual world picture of the battle interface includes a first virtual object 301, a second virtual object 302, and a virtual environment including buildings, plants, roads, and the like in the field of vision. A control layer of the battle interface includes a first control 303, another skill control 304, and a direction control 305 configured to control the first virtual object 301 to move and change a direction. A user may trigger these controls through operations such as clicking and dragging. In addition, the control layer further includes a map control 306 configured to display a virtual world, a control 307 configured to display information such as a record and a game duration, and UI controls configured for game setting, voice calls, message transmission, and other functions.

Step 202: Determine a target virtual object from the at least one second virtual object, and label the target virtual object in a predetermined manner.

In certain embodiments, the terminal searches for the second virtual objects in real time, and determines a second virtual object meeting a preset condition as a target virtual object, and labels the target virtual object.

The preset condition may be at least one of the following: the second virtual object conforming to an object on which an ordinary attack acts, a distance between the second virtual object and the first virtual object meeting a preset distance condition (for example, being closest to the first virtual object), an attribute value of the second virtual object meeting a preset attribute value condition (for example, hit points or a defense value of the second virtual object being lowest), and a target camp to which the second virtual object belongs belonging to a preset camp. In certain embodiments, the preset condition may alternatively be a condition preset by the user, for example, setting priority to attack a type of virtual objects. A manner of selecting the target virtual object is not limited in this embodiment of the present disclosure.

In certain embodiments, predetermined manners in which the target virtual object is labeled include manners such as highlighting an edge of a character image and/or a target attribute information bar of the target virtual object, changing a color of information carried in the target virtual object, adding a special label near (for example, directly below) the character image of the target virtual object, and displaying a ray directed from the first virtual object to the target virtual object.

Figure 4:
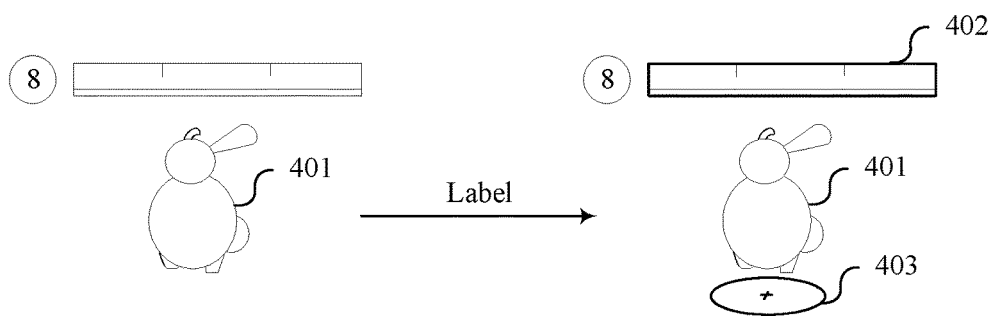
FIG. 4 is a schematic diagram of labeling a target virtual object according to one or more embodiments of the present disclosure.

For example, FIG. 4 shows a manner of labeling a target virtual object 401. After determining the target virtual object 401 from the second virtual objects, the terminal highlights an outer edge of a target attribute information bar 402 above the target virtual object 401, and displays a positioning label 403 directly below the target virtual object 401.

Figure 5:
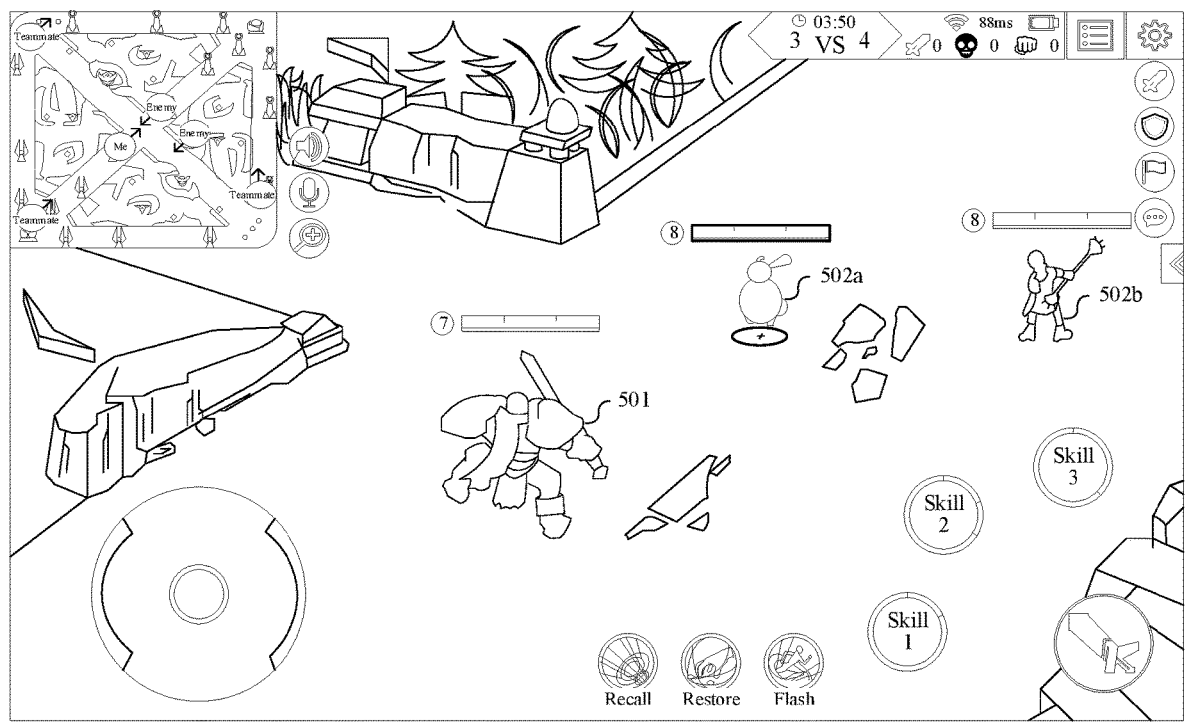
FIG. 5 is a schematic diagram of a battle interface according to one or more embodiments of the present disclosure.

For example, referring to FIG. 5, the battle interface displays a first virtual object 501, a second virtual object 502a, and a second virtual object 502b. The terminal determines the second virtual object 502a from the two second virtual objects as a target virtual object, and then labels the second virtual object 502a in the predetermined manner.

Step 203: Receive a first trigger signal acting on the first control.

In certain embodiments, the first trigger signal is generated when the user performs a triggering operation on the first control. For example, the user may trigger the first trigger signal by performing an operation such as clicking or dragging on the first control.

Step 204: Control, when or in response to determining that the first trigger signal meets an automatic control condition, the first virtual object to use a virtual prop to change a target attribute value of the target virtual object.

In certain embodiments, to implement different control operations on the first virtual object, control instructions for different first trigger signals are preset in the terminal. Different operations performed by the user on the first control correspondingly generate different first trigger signals, so as to control the first virtual object to perform corresponding operations according to the corresponding control instructions.

In certain embodiments, the automatic control condition is preset in the terminal. When a first trigger signal generated by a touch operation on the first control by the user meets the automatic control condition, it indicates that a control instruction corresponding to the first trigger signal is: casting a skill to the target virtual object labeled in advance, to control the first virtual object to use the virtual prop to change the target attribute value of the target virtual object.

In certain embodiments, the terminal controls, based on the first trigger signal, the first virtual object to change the target attribute value of the target virtual object. The target attribute value includes at least one of attribute values such as the remaining health points (or referred to as remaining hit points), the remaining energy value, and the remaining mana value of the first virtual object. For example, that the first virtual object uses the virtual prop to change the target attribute value of the target virtual object may be shown as that the first virtual object uses the virtual prop to attack the target virtual object, to reduce the remaining hit points of the target virtual object.

Based on the above, in this embodiment of the present disclosure, a target virtual object in a battle interface is labeled in a predetermined manner, and when a first trigger signal meeting an automatic control condition and acting on a first control is received, a first virtual object is controlled to change a target attribute value of the target virtual object; and the target virtual object is labeled before the first virtual object is controlled to change the target attribute value of the target virtual object. Therefore, a user can learn, through labeling when an operation has not been performed, a target virtual object on which the operation acts. If the target virtual object does not match an expected object, the target virtual object can be changed through another operation; and if the target virtual object matches the expected object, the operation may be quickly performed by using the first control, thereby improving control efficiency and control accuracy for a virtual object.

Figure 6:
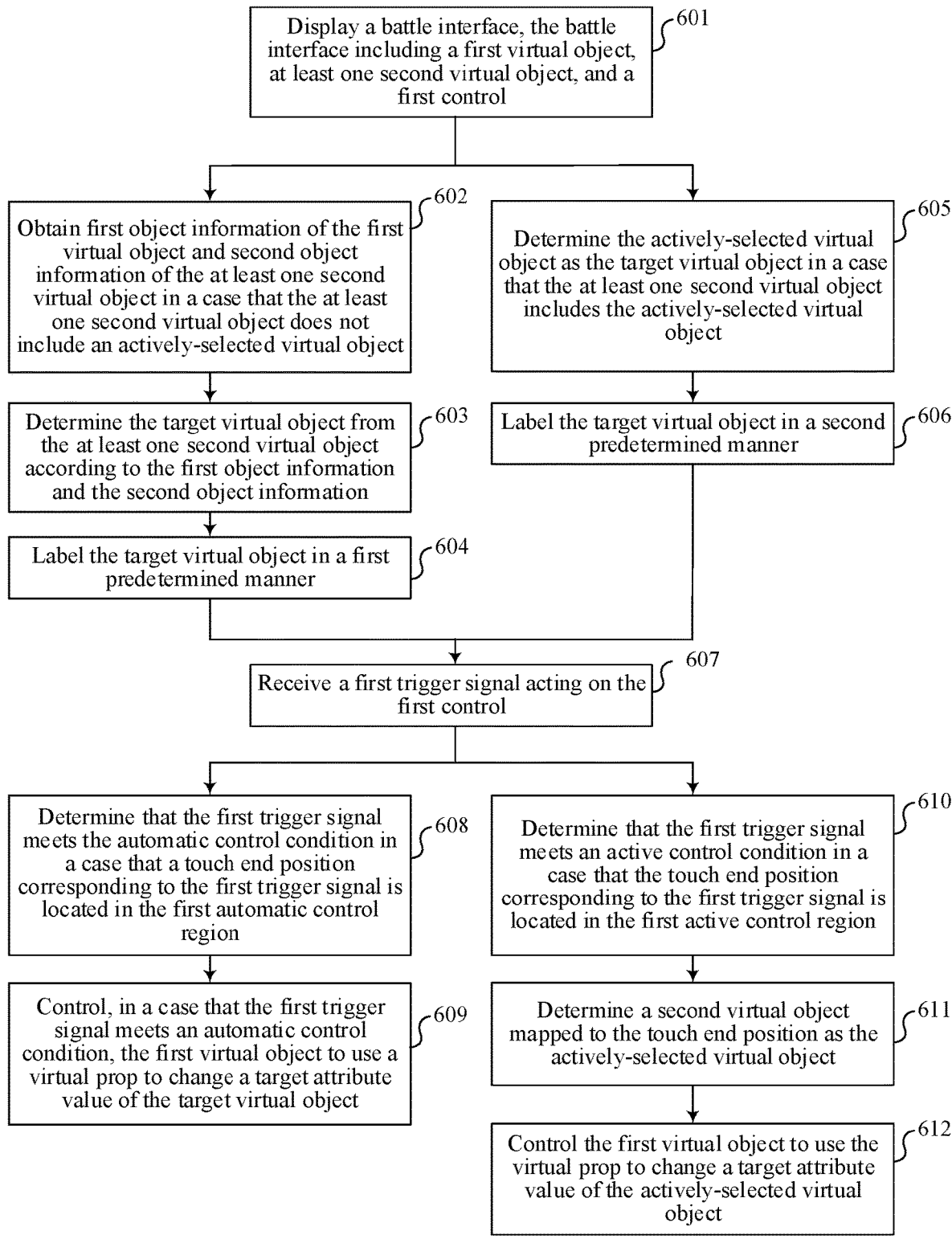
FIG. 6 is a schematic flowchart of a virtual object control method according to one or more embodiments of the present disclosure.

FIG. 6 is a flowchart of a virtual object control method according to another exemplary embodiment of the present disclosure. This embodiment is described by using an example in which the method is applied to the first terminal 110 or the second terminal 130 in the implementation environment shown in FIG. 1 or another terminal in the implementation environment. The method includes the following steps:

Step 601: Display a battle interface, the battle interface including a first virtual object, at least one second virtual object, and a first control.

For the implementation of step 601, reference may be made to step 201, and details are not described again in this embodiment of the present disclosure.

Step 602: Obtain first object information of the first virtual object and second object information of the at least one second virtual object when or in response to determining that the at least one second virtual object does not include an actively-selected virtual object.

In certain embodiments, the first control has two functions: automatically controlling the first virtual object to perform an attack, and actively selecting an attack target and then controlling the first virtual object to perform an attack. An attack priority of the actively selected attack target is higher than an attack priority of an attack target of an automatically control operation. The actively-selected virtual object is a virtual object selected by the user by triggering the first control, and object information is used for representing a state and a position of the virtual object. For example, the position in the object information is used for indicating a position of the virtual object in a virtual world, and the state in the object information is used for indicating current attribute values of the virtual object. For example, the first object information includes at least one of coordinates of the first virtual object in the virtual world, a level, a force value, and a used virtual prop of the first virtual object, and information such as the remaining energy value and the remaining hit points that may affect the force value. The second object information includes at least one of coordinates of the second virtual object in the virtual world and state information such as a defense value, the remaining hit points, and the remaining energy value.

In certain embodiments, if the user does not control the first control to select any second virtual object, correspondingly, the second virtual objects does not include an actively-selected virtual object, and the terminal may need to perform automatic search according to the first object information and the second object information, so as to determine a target virtual object from the at least one second virtual object.

Because the determined target virtual object is an object to which a preset attack skill (an attack skill that may be cast by triggering the first control) is cast, correspondingly, it may be desirable to ensure that the preset attack skill can act on the target virtual object, or can cause expected damage to the target virtual object. Whether the skill casting effect can be achieved has a specific relationship with position information, remaining hit points, defense values, and remaining energy values of the first virtual object and the second virtual object. Therefore, In certain embodiments, when the terminal may need to select a target virtual object from a plurality of second virtual objects, the terminal first may need to obtain object information of the first virtual object and the second virtual objects, so as to select an optimal target virtual object from the plurality of second virtual objects based on the object information.

Step 603: Determine the target virtual object from the at least one second virtual object according to the first object information and the second object information.

In certain embodiments, if second object information of a second virtual object meets a preset condition, the terminal determines the second virtual object as a target virtual object; and if there is no second virtual object whose second object information meets the preset condition, no target virtual object exists. For example, there is one target virtual object.

The present disclosure only provides a description by using an example in which the quantity of the target virtual object is 1, and does not limit the quantity of the target virtual objects. If there are two or more target virtual objects meeting the preset condition, the corresponding quantity of the target virtual objects may be two or more.

In certain embodiments, the quantity of selected target virtual objects may alternatively be determined by an attack type corresponding to the preset attack skill. For example, the preset attack skill can only act on a single virtual object, and correspondingly, only a single target virtual object can be selected. If the preset attack skill can act on two or more virtual objects, correspondingly, the terminal can select two or more target virtual objects meeting the preset condition.

In certain embodiments, the first object information includes a first position and a first range, the second object information includes a second position, the first position being a position in which the first virtual object is located in the virtual world, the second position being a position in which the second virtual object is located in the virtual world, and the first range being a use range of the virtual prop.

In certain embodiments, step 603 includes the following steps 1 to 3:

Step 1: Determine a second range according to the first range, the second range being larger than the first range.

The second range is a range in which the terminal searches for a target virtual object. In certain embodiments, to include a second virtual object near the first virtual object into the search range, the second range is set to be larger than the first range. In certain embodiments, the first range and the second range are both circular ranges, or are both fan-shaped regions in which the first virtual object faces a predetermined direction and a predetermined angle.

For example, the terminal sets a radius of the second range to: a radius of the first range+k. For example, when the first range is a circular region, the terminal sets the second range to a circular region with the same center as the first range and a radius 2 meters longer than the radius of the first range. For example, the first range is a region in which a circle with the first position as a center and a radius of 5 meters is located in the virtual world, then it is determined that the second range is a region in which a circle with the first position as a center and a radius of 7 meters is located in the virtual world. Alternatively, the first range is a fan-shaped region in the virtual world with the first position as a center, a radius of 5 meters, and an angle of 45° and located directly in front of the first virtual object, then it is determined that the second range is a circular region in the virtual world with the first position as a center and a radius of 7 meters.

In certain embodiments, because the target virtual object is an object to which a preset attack skill is triggered to cast. That is, the target virtual object may need to be located within a predetermined skill casting range. Therefore, in certain embodiments, the second range may be determined based on the skill casting range of the preset attack skill. For example, the second range may be smaller than or equal to the skill casting range. In certain embodiments, different attack skills may correspond to different skill casting ranges. Correspondingly, different second ranges may be set for different attack skills.

Step 2: Determine a second virtual object within the second range as a candidate virtual object according to the first position and the second position.

Because the target virtual object first may need to be located within an attackable range of the first virtual object, correspondingly, the target virtual object may need to meet a specific position condition. That is, the second position corresponding to the target virtual object may need to be within the second range. In certain embodiments, the terminal determines second virtual objects within the second range as candidate virtual objects, and then determines a target virtual object from the candidate virtual objects according to another condition.

Figure 7:
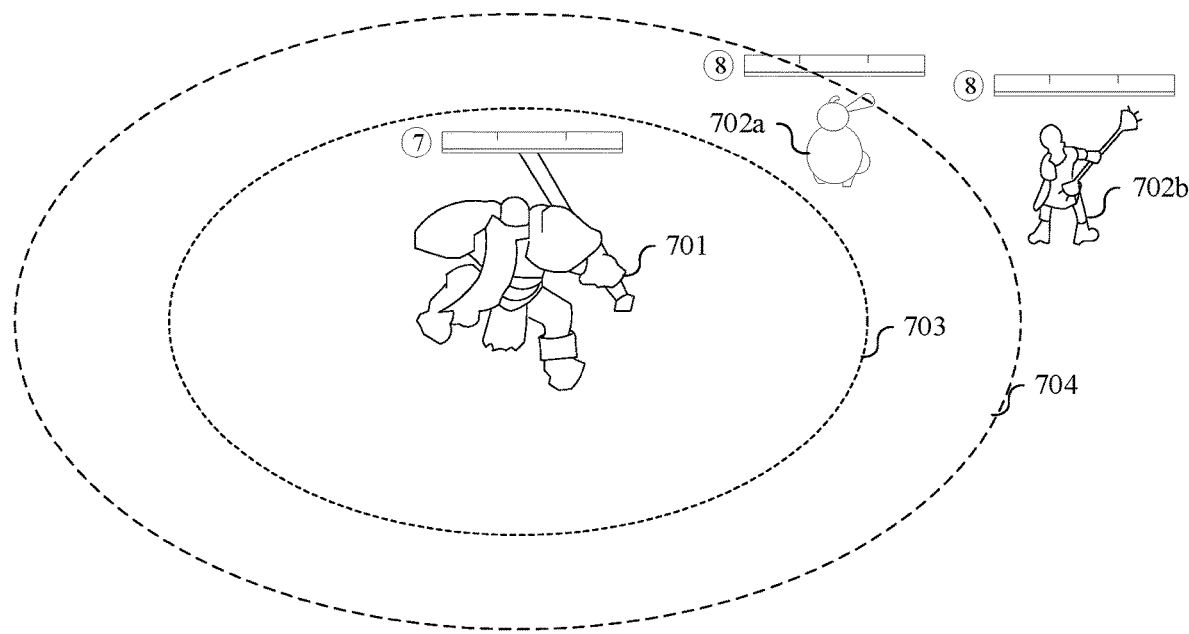
FIG. 7 is a schematic diagram of determining a candidate virtual object according to one or more embodiments of the present disclosure.

For example, referring to FIG. 7, virtual objects in the current virtual world include a first virtual object 701, a second virtual object 702a, and a second virtual object 702b. The terminal determines a second range 704 according to a first position and a first range 703 of the first virtual object 701, and detects that the second virtual object 702a is located within the second range 704, then the second virtual object 702a is determined as a candidate virtual object.

Step 3: Determine a candidate virtual object meeting a selection condition as the target virtual object, the selection condition including at least one of the following: having a shortest distance to the first virtual object, having a smallest target attribute value, and belonging to a target camp.

In certain embodiments, the terminal determines a candidate virtual object meeting the selection condition from the candidate virtual objects as a target virtual object. The target virtual object is an attack target at the current time point that is automatically determined by the terminal. If there is no candidate virtual object meeting the selection condition, the terminal determines that no target virtual object exists at the current time point.

For example, target camps include a second camp and a third camp. The second camp is a camp hostile to a first camp to which the first virtual object belongs. The third camp is a camp including virtual objects such as monsters controlled by a server. In certain embodiments, if candidate virtual objects meeting the selection condition include candidate virtual objects belonging to the second camp and candidate virtual objects belonging to the third camp, the terminal determines a target virtual object from the candidate virtual object belonging to the second camp. If there is no target virtual object in the candidate virtual objects belonging to the second camp, a target virtual object is subsequently determined from the candidate virtual objects belonging to the third camp.

Selection of the target virtual object is related to a skill casting effect, to ensure the skill casting effect, for example, improve killing efficiency caused by skill casting, where the killing efficiency may be related to the remaining hit points, the remaining defense value, and the like corresponding to the target virtual object, for example, hit points of a candidate virtual object A are higher than those of a candidate virtual object B, the same skill is separately cast to the two candidate virtual objects. Apparently, a probability of killing the candidate virtual object B is higher than a probability of killing the virtual object A. Therefore, to improve killing efficiency of the first virtual object, the candidate virtual object B may be determined as a target virtual object. That is, a selected target virtual object has a lowest target attribute value. In certain embodiments, in addition to the remaining hit points listed above, target attribute values of the candidate virtual object such as the remaining energy value and a defense value also affect using efficiency of target attack. Correspondingly, the target attribute values may include attribute values such as the remaining hit points, the remaining energy value, and the defense value. In certain embodiments, because a hit rate of an attack skill for the target virtual object may also be related to a distance between the target virtual object and the first virtual object, it can be learned that a longer distance indicates that the hit rate correspondingly decreases. Therefore, to further improve the hit rate of the preset attack skill, a distance to the first virtual object being shortest is also used as one of preset conditions for selecting the target virtual object.

In certain embodiments, the selection condition may alternatively include: whether the preset attack skill can act on the target virtual object, whether there is a probability that a target attack acting on the target virtual object is neutralized, and the like.

For example, as shown in FIG. 7, if the second virtual object 702a meets the selection condition, the second virtual object 702a is determined as a target virtual object; and if the second virtual object 702a does not meet the selection condition, it is determined that no target virtual object exists currently.

Step 604: Label the target virtual object in a first predetermined manner.

In certain embodiments, the first predetermined manner includes a manner such as highlighting an edge of a character image and/or a target attribute information bar of the target virtual object, changing a color of information carried in the target virtual object, adding a special label near (for example, directly below) the character image of the target virtual object, or displaying a ray directed from the first virtual object to the target virtual object.

Step 605: Determine the actively-selected virtual object as the target virtual object when or in response to determining that the at least one second virtual object includes the actively-selected virtual object.

In certain embodiments, the actively-selected virtual object is an attack object during a next attack that is selected by the user by using the first control, and may be the same or different from a target virtual object determined by the terminal through automatic search. In addition, an attack priority of the actively-selected virtual object is higher than an attack priority of the target virtual object determined by the terminal through automatic search. Therefore, when the second virtual objects include the actively-selected virtual object, the terminal directly determines the actively-selected virtual object as a target virtual object, and skips performing a process of determining a candidate virtual object.

For example, as shown in FIG. 7, if the second virtual object 702b is an actively-selected virtual object, the terminal directly determines the second virtual object 702b as a target virtual object.

Step 606: Label the target virtual object in a second predetermined manner.

In certain embodiments, the second predetermined manner is the same as the first predetermined manner, or the second predetermined manner is different from the first predetermined manner; and a significance degree of a labeling effect in the second predetermined manner is higher than a significance degree of a labeling effect in the first predetermined manner.

For example, labeling manners of the second predetermined manner and the first predetermined manner are different. For example, different labeling positions are used in the second predetermined manner and the first predetermined manner, or the labeling positions are the same, but the labeling is performed by using different colors. For example, the first predetermined manner is highlighting an edge of a target attribute information bar of the target virtual object, and the second predetermined manner is adding a positioning label directly below the character image of the target virtual object.

Step 607: Receive a first trigger signal acting on the first control.

For the implementation of step 607, reference may be made to step 203, and details are not described again in this embodiment of the present disclosure.

Step 608: Determine that the first trigger signal meets the automatic control condition when or in response to determining that a touch end position corresponding to the first trigger signal is located in the first automatic control region.

In certain embodiments, the first control includes a first automatic control region and a first active control region, no intersection existing between the first automatic control region and the first active control region. A trigger operation in the first automatic control region is used for triggering a quick attack to the target virtual object, and a trigger operation in the first active control region is used for triggering the user to independently select a target virtual object.

Figure 8:
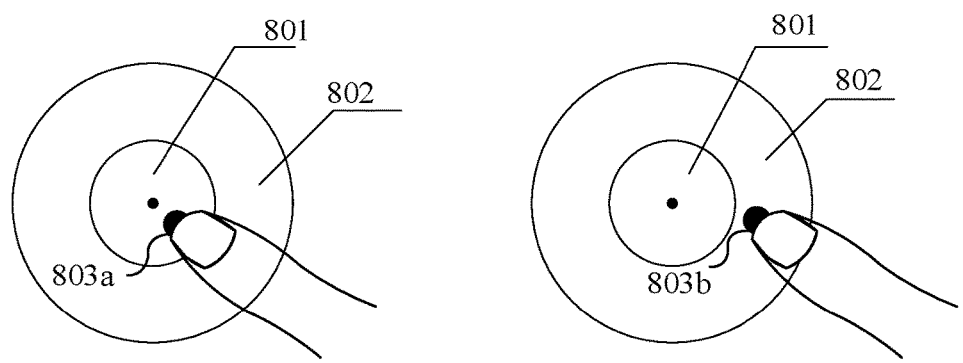
FIG. 8 is a schematic diagram of a first control according to one or more embodiments of the present disclosure.

In certain embodiments, the first control is a circular control, the first automatic control region is circular, and the first active control region is an annular region surrounding the first automatic control region; or the first automatic control region is a left-side semi-circular region of the first control, and the first active control region is a right-side semi-circular region of the first control. This is not limited in this embodiment of the present disclosure. For example, FIG. 8 is a schematic diagram of a first control. The first control is a circular control. A first automatic control region 801 is a circular region with the center of the first control as a center and a radius shorter than a radius of the first control, and a first active control region 802 is an annular part in the first control other than the first automatic control region 801.

For example, as shown in the left side of FIG. 8, when the user clicks the first control in the first automatic control region 801 with a finger, and a touch end position 803a is in the first automatic control region 801, the terminal determines that the first trigger signal meets the automatic control condition. That is, by quickly clicking the first control, the user can control the first virtual object to change the target attribute value of the target virtual object.

Step 609: Control, when or in response to determining that the first trigger signal meets an automatic control condition, the first virtual object to use a virtual prop to change a target attribute value of the target virtual object.

In certain embodiments, the terminal determines, according to the touch end position, whether the first trigger signal meets the automatic control condition. When the touch end position is in the first automatic control region, the terminal determines that the first trigger signal meets the automatic control condition; and when the touch end position is in the first active control region or a region outside the first control, the terminal determines that the first trigger signal does not meet the automatic control condition.

Figure 9:
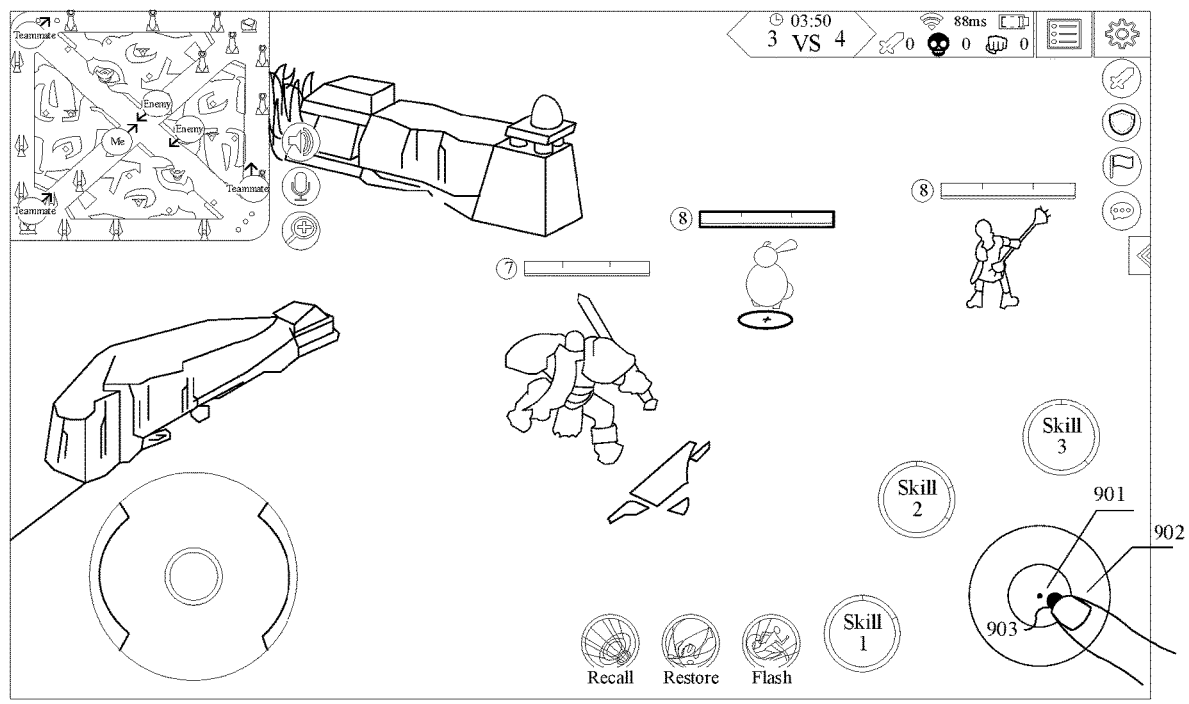
FIG. 9 is a schematic diagram of a battle interface according to one or more embodiments of the present disclosure.

For example, referring to FIG. 9, the first control includes a first automatic control region 901 and a first active control region 902. The user clicks the first control, and a touch end position 903 is in the first automatic control region 901, that is, the user raises a finger in the touch end position 903 shown in the figure. The terminal determines that the first trigger signal meets the automatic control condition.

Step 610: Determine that the first trigger signal meets an active control condition when or in response to determining that the touch end position corresponding to the first trigger signal is located in the first active control region.

In certain embodiments, the user may actively select a target virtual object through a touch operation on the first control. Correspondingly, the terminal obtains a touch end position of the first trigger signal, and determines that the touch end position is in the first active control region, to determine that the first trigger signal meets the active control condition, thereby determining, based on the touch end position, a target virtual object that the user may need to select.

In certain embodiments, the user may press and hold the first control with a finger and simultaneously perform dragging, and stop the finger at a corresponding position of the first active control region according to positions of the first virtual object and an expected attack object, thereby completing a process of selecting an actively-selected virtual object.

For example, referring to the right side of FIG. 8, when the user clicks the first control with a finger, and drags the finger to make a touch end position 803*b* located in a first active control region 802, the terminal determines that the first trigger signal meets the active control condition.

Figure 10:
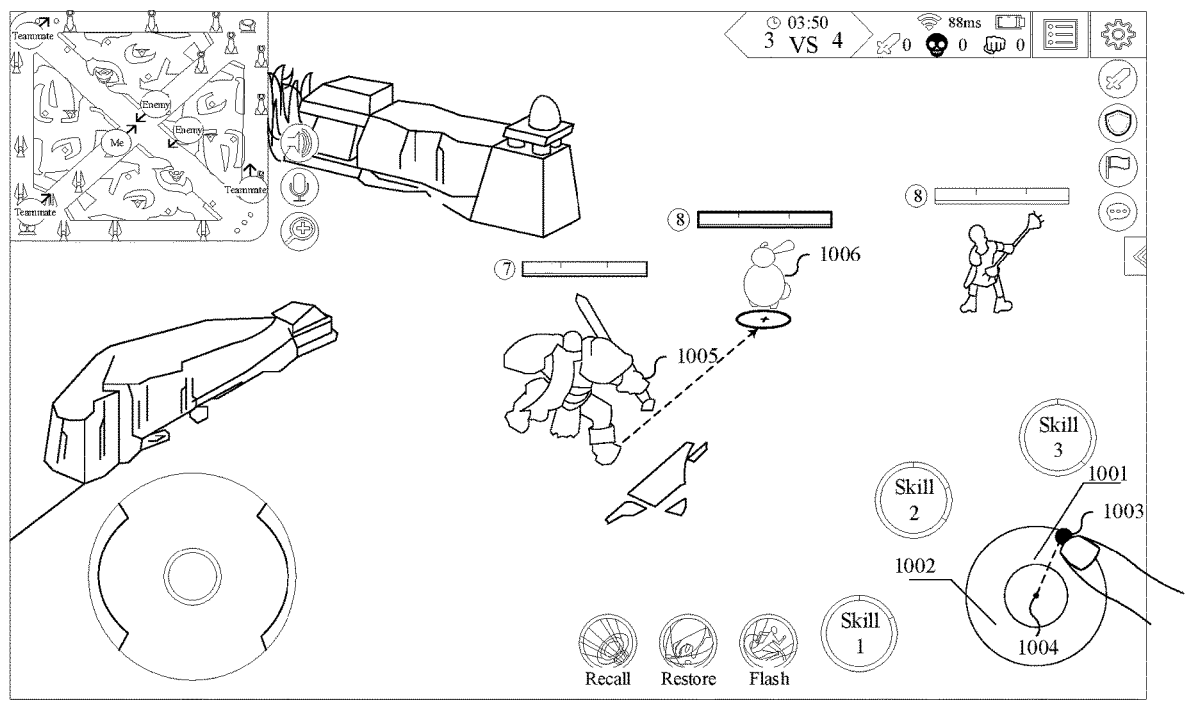
FIG. 10 is a schematic diagram of a battle interface according to one or more embodiments of the present disclosure.

For example, referring to FIG. 10, the first control includes a first automatic control region 1001 and a second active control region 1002. When the user clicks the first control with a finger, and drags the finger to make a touch end position 1003 located in the second active control region 1002, the terminal determines that the first trigger signal meets the active control condition.

Step 611: Determine a second virtual object mapped to the touch end position as the actively-selected virtual object.

In certain embodiments, the terminal determines a mapping position in the virtual world in real time according to a position of the finger of the user in the second automatic control region, and determines the actively-selected virtual object according to the second virtual object mapped to the touch end position. To facilitate the user to quickly determine the actively-selected virtual object, the terminal may label a mapping position of the touch end position in the virtual world in the battle interface in a labeling manner such as using a ray or using a fan-shaped region. When the touch operation of the user correspondingly aims at a second virtual object in the virtual world, or there is a second virtual object near the mapping position of the touch operation, the second virtual object is determined as the actively-selected virtual object, and step 606 is performed, to label the actively-selected virtual object.

In certain embodiments, a range from which the user selects the actively-selected virtual object is a range of a virtual world included in the battle interface.

For example, as shown in FIG. 10, the terminal maps a first control center point 1004 to a position of a first virtual object 1005, determines a mapping position of a touch end position 1003 in the battle interface, displays a connection line between the two mapping positions in the battle interface, and when the touch end position 1003 is mapped to a position of a second virtual object 1006, determines that the second virtual object 1006 is the actively-selected virtual object and labels the second virtual object 1006.

Step 612: Control the first virtual object to use the virtual prop to change a target attribute value of the actively-selected virtual object.

In certain embodiments, when the user raises his hand in the touch end position, the terminal controls the first virtual object to use the virtual prop to change the target attribute value of the actively-selected virtual object.

In certain embodiments, when the terminal controls the first virtual object to perform the operation of changing the target attribute value of the actively-selected virtual object, the terminal still keeps a label to the actively-selected virtual object, determines the actively-selected virtual object as a target virtual object, and when a first touch signal meeting the automatic control condition is received next time, controls the first virtual object to change the target attribute value of the actively-selected virtual object.

For example, if the actively-selected virtual object is outside a range in which the first virtual object uses the virtual prop, the terminal controls the first virtual object to move toward the actively-selected virtual object, and when actively-selected virtual object is within the range in which the first virtual object uses the virtual prop, controls the first virtual object to use the virtual prop to change the target attribute value of the actively-selected virtual object.

In this embodiment of the present disclosure, by performing region division on the first control, the user can actively select a virtual object. When there is an actively-selected virtual object, the actively-selected virtual object is directly determined as a target virtual object and is labeled; and when there is no actively-selected virtual object, a second virtual object meeting the preset condition is determined as a target virtual object and is labeled. The user may control, through a quick operation, the first virtual object to change the target attribute value of the target virtual object. The target virtual object is labeled before the user performs a touch operation on the first control, so that the user can learn in advance an object on which a target attribute value change operation is to be performed. If the target virtual object is different from an expected virtual object of the user, the user may select another virtual object by controlling the first virtual object to perform an operation such as moving or aiming, to avoid a situation in which the user operation does not achieve the expected effect due to a difference between the target virtual object and the expected virtual object, and the operation may need to be re-adjusted, thereby improving operation efficiency.

Figure 11:
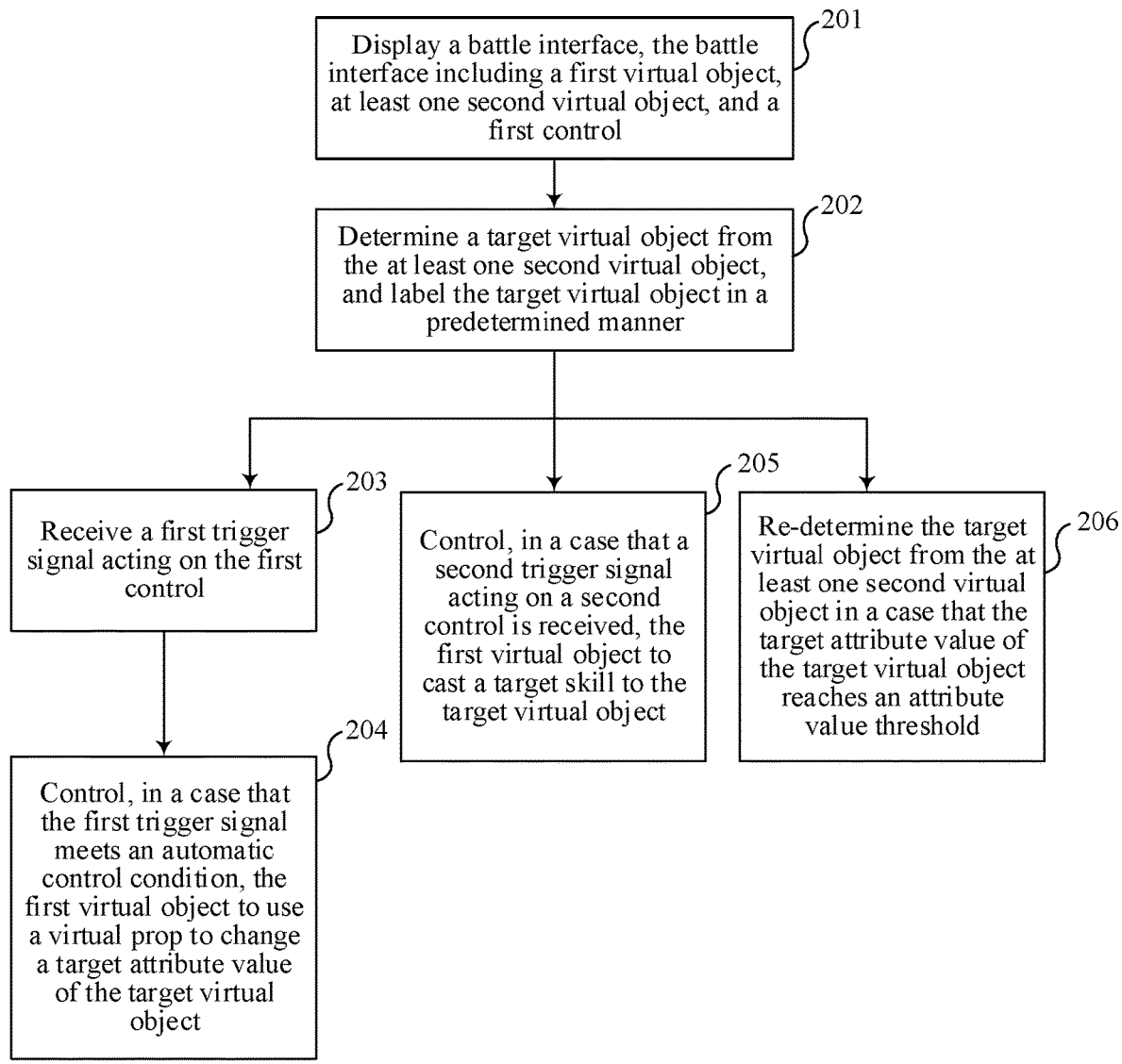
FIG. 11 is a flowchart of a virtual object control method according to one or more embodiments of the present disclosure.

In certain embodiments, in addition to the first control, the control layer of the battle interface further includes another control configured to control the first virtual object to cast the target skill to the target virtual object. Based on FIG. 2, referring to FIG. 11, after step 202, the virtual object control method further includes the following steps:

Step 205: Control, when or in response to determining that a second trigger signal acting on the second control is received, the first virtual object to cast the target skill to the target virtual object.

In certain embodiments, the battle interface further includes a second control, the second control being configured to control the first virtual object to cast a target skill to other virtual objects.

For example, as shown in FIG. 3, the battle interface includes at least one second control 304 configured to control the first virtual object to cast a target skill to other virtual objects.

In certain embodiments, the second control includes a second automatic control region and a second active control region, no intersection existing between the second automatic control region and the second active control region; and step 205 includes the following step 1 and step 2:

Step 1: Obtain a skill casting rule of the target skill when or in response to determining that a touch end position corresponding to the second trigger signal is located in the second automatic control region.

The first virtual object has various skills, and some skills are not applicable to the target virtual object, for example, a skill for the user to apply a special effect to a virtual object in the same camp, or a skill requiring the user to actively aiming a second virtual object. Therefore, in certain embodiments, when the touch end position of the second trigger signal is in the second automatic control region, the terminal first obtains the skill casting rule of the target skill. The skill casting rule includes a type of a skill casting target, a skill casting range, a skill request operation, and the like.

Figure 12:
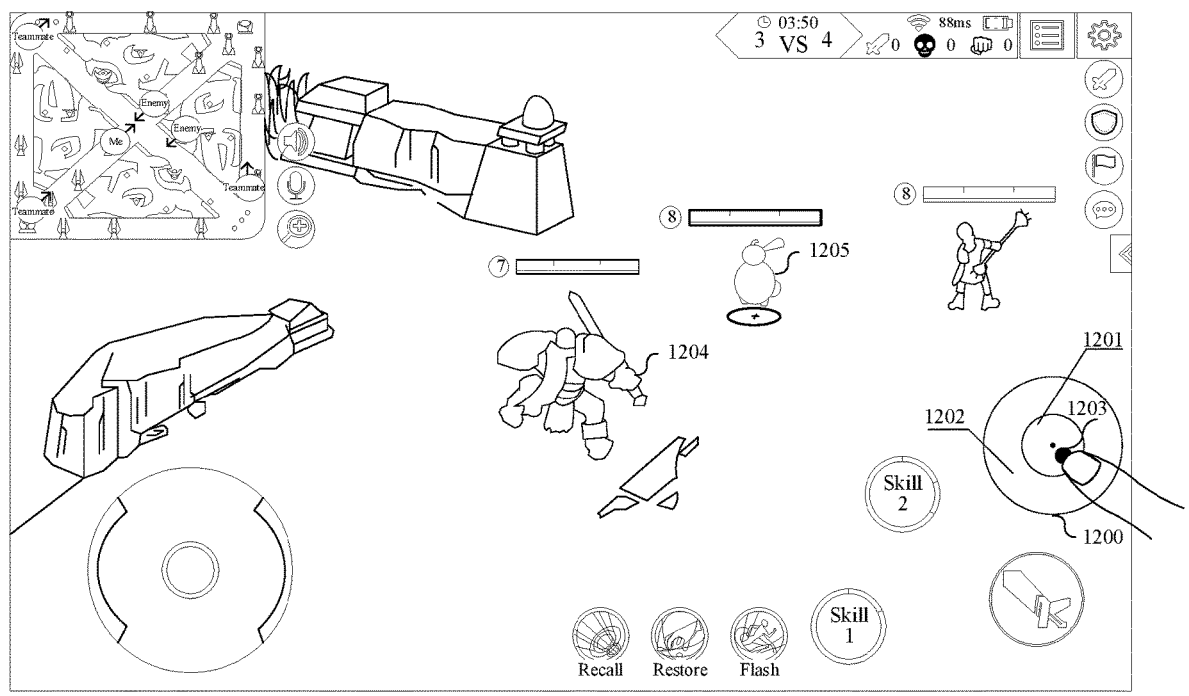
FIG. 12 is a schematic diagram of a battle interface according to one or more embodiments of the present disclosure.

For example, referring to FIG. 12, a second control 1200 includes a second automatic control region 1201 and a second active control region 1202. When a touch end position 1203 of a second trigger signal is in the second automatic control region 1201, the terminal obtains a skill casting rule for a skill 3.

Step 2: Control, when or in response to determining that the target virtual object meets the skill casting rule, the first virtual object to cast the target skill to the target virtual object.

The target virtual object is a target virtual object determined by the terminal through automatic search, or an actively-selected object selected by the user by triggering the first control.

In certain embodiments, to improve skill casting efficiency, the terminal may select the target virtual object based on the skill casting rule.

For example, as shown in FIG. 12, when a target virtual object 1205 meets the skill casting rule of the skill 3, the terminal controls a first virtual object 1204 to cast the skill 3 to the target virtual object 1205. If the target virtual object 1205 is outside a casting range of the skill 3, the terminal controls the first virtual object 1204 to move toward the target virtual object 1205, and when the target virtual object 1205 is within the casting range of the skill 3, controls the first virtual object 1204 to cast the skill 3.

Step 206: Re-determine the target virtual object from the at least one second virtual object when or in response to determining that the target attribute value of the target virtual object reaches an attribute value threshold.

That the target attribute value of the target virtual object reaches an attribute value threshold includes at least one of the following situations: the remaining hit points of the target virtual object reaches a hit point threshold, for example, the hit point threshold is 0, and when the remaining hit points of the target virtual object is 0, the target attribute value meeting the attribute value threshold is met; and a position of the target virtual object is outside a display range of the battle interface.

In certain embodiments, an example in which the target attribute value is the remaining hit points is used. If the remaining hit points corresponding to the target virtual object is 0, it indicates that the target virtual object is killed and cannot continue to be used as a target virtual object, and the terminal may need to obtain object information corresponding to the first virtual object and the remaining second virtual objects again, so as to determine a target virtual object from the second virtual objects based on the object information.

In this embodiment of the present disclosure, by dividing the second control into the second active control region and the second automatic control region, the user can control, through a quick operation, the first virtual object to cast a target skill to a target virtual object, thereby simplifying operation steps of some skills and saving an operation time of the user.

Figure 13:
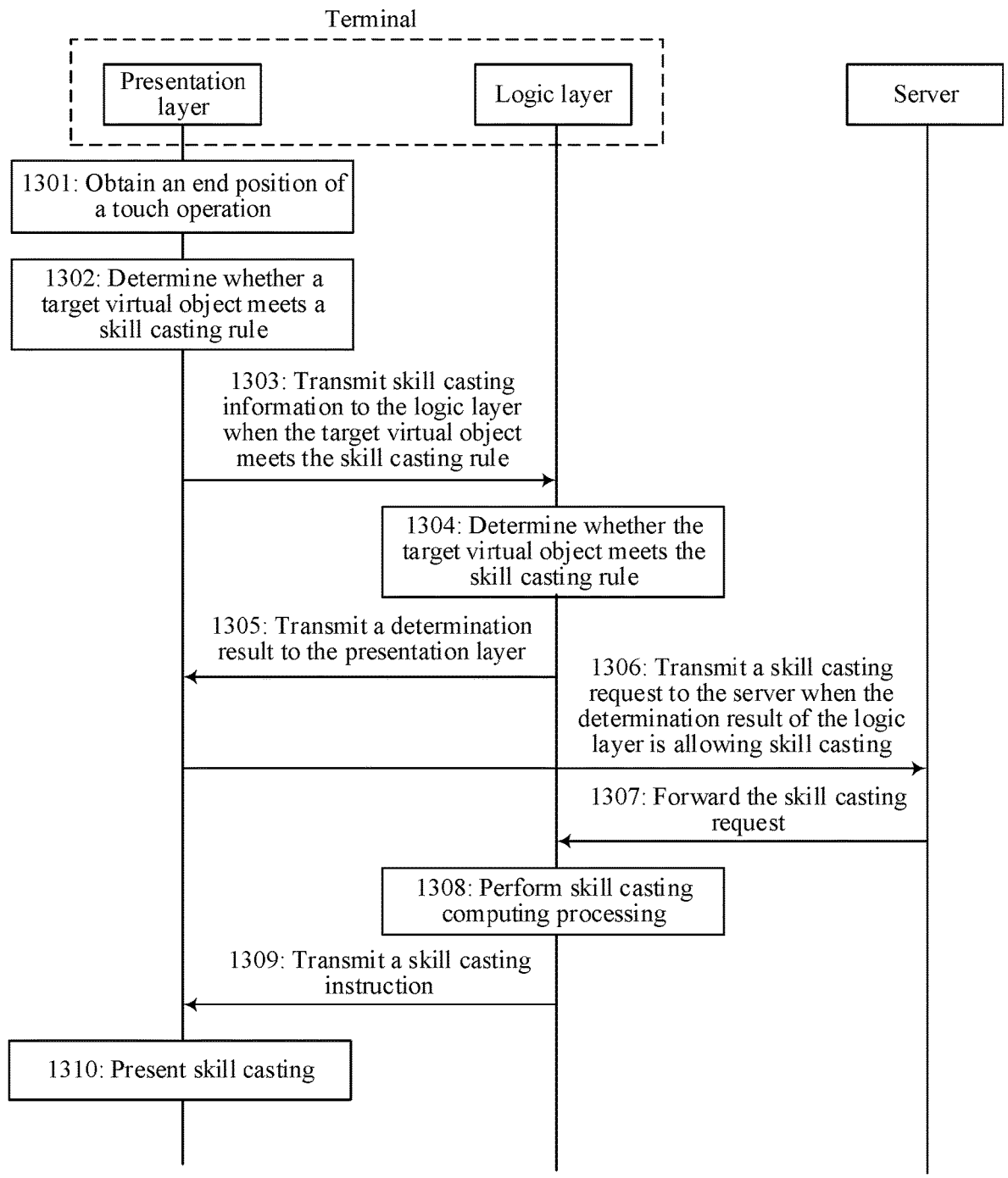
FIG. 13 is a schematic flowchart of a virtual object control method according to one or more embodiments of the present disclosure.

In certain embodiments, a MOBA game application includes a presentation layer and a logic layer. FIG. 13 is a flowchart of a virtual object control method according to another exemplary embodiment of the present disclosure. This embodiment is described by using an example in which the method is applied to the first terminal 110 or the second terminal 130 in the implementation environment shown in FIG. 1 or another terminal in the implementation environment. The method includes the following steps:

Step 1301: A presentation layer obtains an end position of a touch operation.

When a user performs a touch operation on a first control or a second control, the presentation layer obtains the touch operation in real time, and obtains an end position of the touch operation when detecting that the user rises a hand.

Step 1302: The presentation layer determines whether a target virtual object meets a skill casting rule.

The presentation layer obtains a target skill corresponding to the touch operation. The target skill includes a basic skill corresponding to the first control and a special skill corresponding to the second control. Whether the target virtual object meets the skill casting rule is determined according to a type of the target skill and the skill casting rule. When the target virtual object meets the skill casting rule, step 1303 is performed.

Step 1303: The presentation layer transmits skill casting information to a logic layer when the target virtual object meets the skill casting rule.

After the presentation layer determines that the target virtual object meets the skill casting rule, the logic layer may need to perform further determination, so as to avoid a determination error of the presentation layer due to a picture delay or a fraudulent behavior of the user.

Step 1304: The logic layer determines whether the target virtual object meets the skill casting rule.

Step 1305: The logic layer transmits a determination result to the presentation layer.

The logic layer transmits the determination result to the presentation layer. If the result indicates that the target virtual object does not meet the skill casting rule, subsequent steps are not performed. A display result in a battle interface is that there is no response after the user triggers the control, and the target skill is not cast.

Step 1306: The presentation layer transmits a skill casting request to a server when the determination result of the logic layer is allowing skill casting.

Step 1307: The server forwards the skill casting request.

The server receives the skill casting request transmitted by the presentation layer of terminal, obtains a target terminal according to the skill casting information in the skill casting request, and forwards the skill casting request to a logic layer of the target terminal. The target terminal includes all terminals participating the current battle.

Step 1308: The logic layer performs skill casting computing processing.

When receiving the skill casting request forwarded by the server, the logic layer determines to perform a skill casting operation, and performs skill casting computing processing, to obtain a skill casting result, for example, a target attribute value of the target virtual object after skill casting.

Step 1309: The logic layer transmits a skill casting instruction.

After computing, the logic layer transmits a skill casting instruction to the presentation layer.

Step 1310: The presentation layer presents skill casting.

The presentation layer renders a skill casting effect in the battle interface according to the skill casting instruction of the logic layer.

Figure 14:
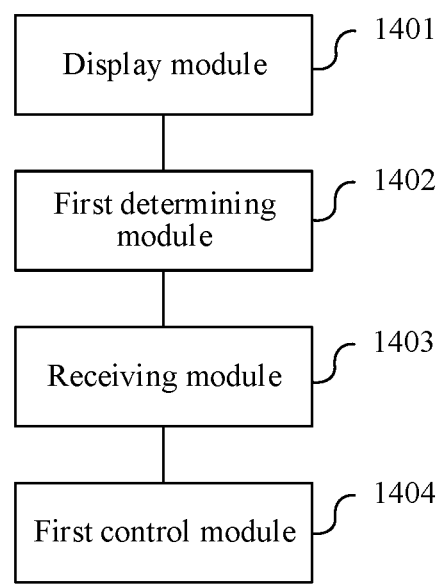
FIG. 14 is a schematic structural block diagram of a virtual object control apparatus according to one or more embodiments of the present disclosure.

FIG. 14 is a structural block diagram of a virtual object control apparatus according to an exemplary embodiment of the present disclosure. The apparatus may be disposed in the first terminal 110 or the second terminal 130 in the implementation environment shown in FIG. 1 or another terminal in the implementation environment. The apparatus includes: a display module 1401, configured to display a battle interface, the battle interface including a first virtual object, at least one second virtual object, and a first control, the first virtual object and the second virtual object being located in a virtual world and belonging to different camps, and the first control being configured to control the first virtual object to use a virtual prop to change target attribute values of other virtual objects; a first determining module 1402, configured to: determine a target virtual object from the at least one second virtual object, and label the target virtual object in a predetermined manner; a receiving module 1403, configured to receive a first trigger signal acting on the first control; and a first control module 1404, configured to control, when or in response to determining that the first trigger signal meets an automatic control condition, the first virtual object to use the virtual prop to change a target attribute value of the target virtual object.

In certain embodiments, the first determining module 1402 includes: a first obtaining unit, configured to obtain first object information of the first virtual object and second object information of the at least one second virtual object when or in response to determining that the at least one second virtual object does not include an actively-selected virtual object, the actively-selected virtual object being a virtual object selected by using the first control, and object information being used for representing a state and a position of a virtual object; a first determining unit, configured to determine the target virtual object from the at least one second virtual object according to the first object information and the second object information; and a first labeling unit, configured to label the target virtual object in a first predetermined manner.

In certain embodiments, the first object information includes a first position and a first range, the second object information includes a second position, the first position being a position in which the first virtual object is located in the virtual world, the second position being a position in which the second virtual object is located in the virtual world, and the first range being a use range of the virtual prop; and the first determining unit is further configured to: determine a second range according to the first range, the second range being larger than the first range; determine a second virtual object within the second range as a candidate virtual object according to the first position and the second position; and determine a candidate virtual object meeting a selection condition as the target virtual object, the selection condition including at least one of the following: having a shortest distance to the first virtual object, having a smallest target attribute value, and belonging to a target camp.

In certain embodiments, the first determining module 1402 includes: a second determining unit, configured to determine the actively-selected virtual object as the target virtual object when or in response to determining that the at least one second virtual object includes the actively-selected virtual object; and a second labeling unit, configured to label the target virtual object in a second predetermined manner.

In certain embodiments, the first control includes a first automatic control region and a first active control region, no intersection existing between the first automatic control region and the first active control region; and the apparatus further includes: a second determining module, configured to determine that the first trigger signal meets the automatic control condition when or in response to determining that a touch end position corresponding to the first trigger signal is located in the first automatic control region.

In certain embodiments, the apparatus further includes: a third determining module, configured to determine that the first trigger signal meets an active control condition when or in response to determining that the touch end position corresponding to the first trigger signal is located in the first active control region; a fourth determining module, configured to determine a second virtual object mapped to the touch end position as the actively-selected virtual object; and a second control module, configured to control the first virtual object to use the virtual prop to change a target attribute value of the actively-selected virtual object.

In certain embodiments, the battle interface further includes a second control, the second control being configured to control the first virtual object to cast a target skill to other virtual objects; and the apparatus further includes: a third control module, configured to control, when or in response to determining that a second trigger signal acting on the second control is received, the first virtual object to cast the target skill to the target virtual object.

In certain embodiments, the second control includes a second automatic control region and a second active control region, no intersection existing between the second automatic control region and the second active control region; and the third control module includes: a second obtaining unit, configured to obtain a skill casting rule of the target skill when or in response to determining that a touch end position corresponding to the second trigger signal is located in the second automatic control region; and a control unit, configured to control, when or in response to determining that the target virtual object meets the skill casting rule, the first virtual object to cast the target skill to the target virtual object.

In certain embodiments, the apparatus further includes: a fifth determining module, configured to re-determine the target virtual object from the at least one second virtual object when or in response to determining that the target attribute value of the target virtual object reaches an attribute value threshold.

In certain embodiments, that the target attribute value of the target virtual object reaches an attribute value threshold includes: the remaining hit points of the target virtual object reaching a hit point threshold, and a position of the target virtual object being outside a display range of the battle interface.

Based on the above, by means of the virtual object control apparatus provided in this embodiment of the present disclosure, a target virtual object in a battle interface is labeled in a predetermined manner, and when a first trigger signal meeting an automatic control condition and acting on a first control is received, a first virtual object is controlled to change a target attribute value of the target virtual object; and the target virtual object is labeled before the first virtual object is controlled to change the target attribute value of the target virtual object. Therefore, a user can learn, through labeling when an operation has not been performed, a target virtual object on which the operation acts. If the target virtual object does not match an expected object, the target virtual object can be changed through another operation; and if the target virtual object matches the expected object, the operation may be quickly performed by using the first control, thereby improving control efficiency and control accuracy for a virtual object. In addition, a task to confirm and label an operation object in a process of performing the operation can be avoided, so as to reduce an operation execution delay, thereby improving man-machine interaction efficiency.

Figure 15:
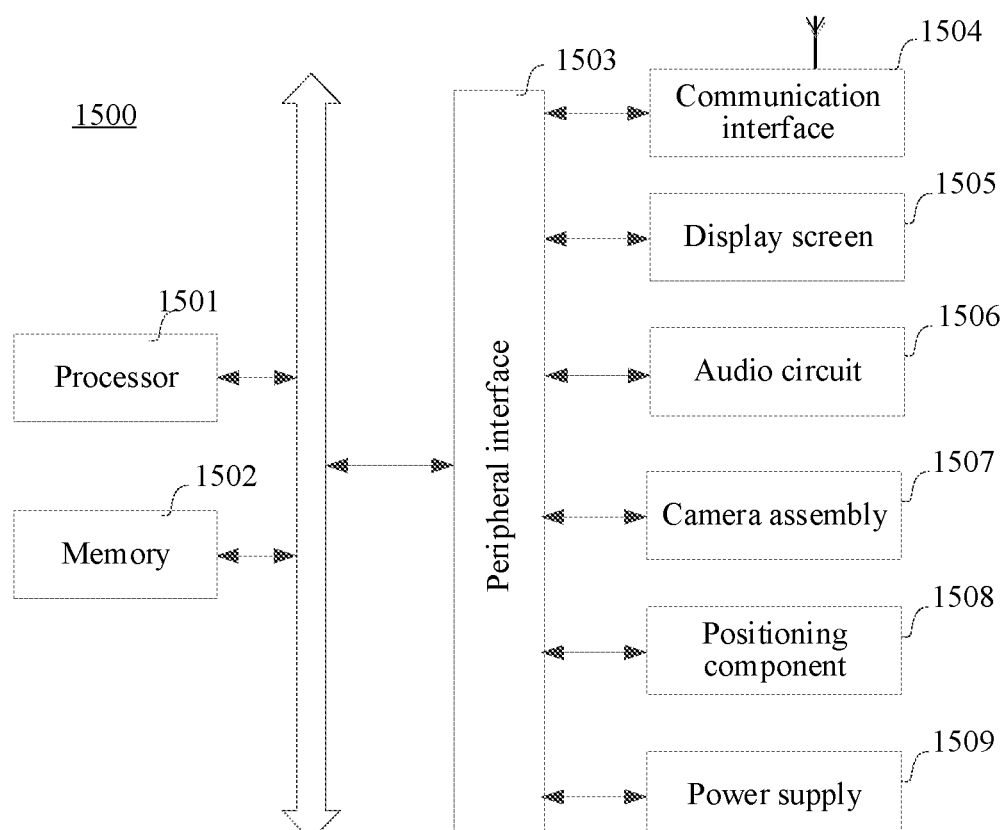
FIG. 15 is a schematic structural block diagram of a terminal according to one or more embodiments of the present disclosure.

FIG. 15 is a structural block diagram of a terminal according to an embodiment of the present disclosure. Generally, a terminal 1500 includes a processor 1501 and a memory 1502.

The processor 1501 may include one or more processing cores, for example, a 4-core processor or an 8-core processor. The processor 1501 may be implemented by using at least one hardware form of a digital signal processor (DSP), a field-programmable gate array (FPGA), and a programmable logic array (PLA). The processor 1501 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1501 may be integrated with a graphics processing unit (GPU). The GPU is configured to render and draw content that may need to be displayed on a display screen. In some embodiments, the processor 1501 may further include an artificial intelligence (AI) processor. The AI processor is configured to process a computing operation related to machine learning.

The memory 1502 may include one or more computer-readable storage media that may be non-transitory. The memory 1502 may further include a high-speed random access memory (RAM), and a non-volatile memory such as one or more magnetic disk storage devices and a flash storage device. In some embodiments, the non-transient computer-readable storage medium in the memory 1502 is configured to store at least one instruction, at least one program, a code set, or an instruction set, the at least one instruction, the at least one program, the code set, or the instruction set being configured to be executed by the processor 1501 to implement the virtual object control method provided in the method embodiment of the present disclosure.

In some embodiments, the terminal 1500 may alternatively include: a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. In certain embodiments, the peripheral may include: at least one of a communication interface 1504, a display screen 1505, an audio circuit 1506, a camera component 1507, a positioning component 1508, and a power supply 1509.

A person skilled in the art may understand that the structure shown in FIG. 15 constitutes no limitation on the terminal 1500, and the terminal may include more or fewer components than those shown in the figure, or some components may be combined, or a different component deployment may be used.

Figure 16:
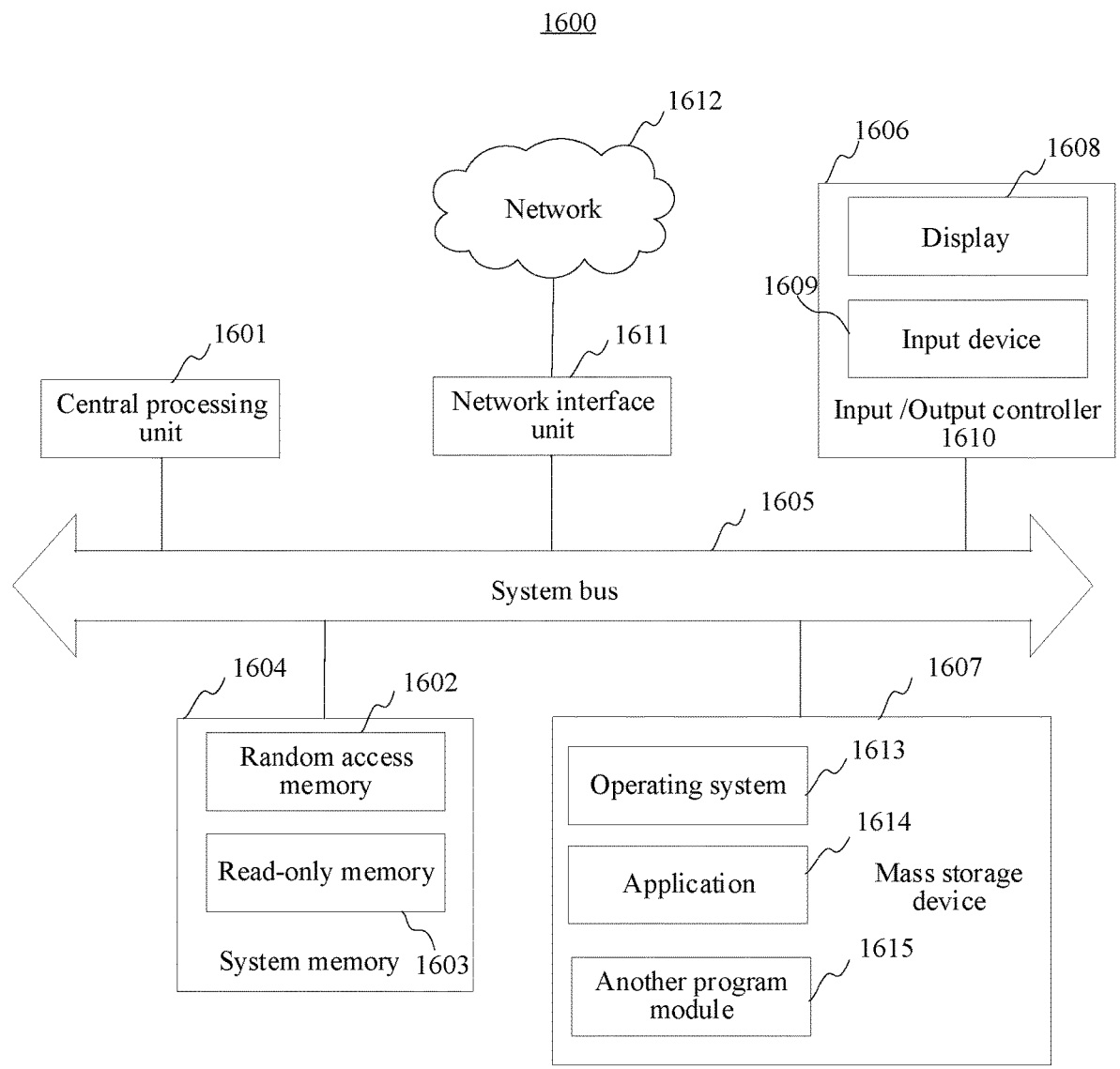
FIG. 16 is a schematic structural block diagram of a server according to one or more embodiments of the present disclosure.

FIG. 16 is a schematic structural diagram of a server according to an embodiment of the present disclosure.

The server 1600 includes a central processing unit (CPU) 1601, a system memory 1604 including a random access memory (RAM) 1602 and a read-only memory (ROM) 1603, and a system bus 1605 connecting the system memory 1604 to the CPU 1601. The server 1600 further includes a basic input/output system (I/O system) 1606 for transmitting information between components in a computer, and a mass storage device 1607 configured to store an operating system 1613, an application 1614, and another program module 1615.

The basic I/O system 1606 includes a display 1608 configured to display information and an input device 1609 such as a mouse or a keyboard that is configured for information inputting by a user. The display 1608 and the input device 1609 are both connected to the CPU 1601 by an input/output controller 1610 connected to the system bus 1605. The basic I/O system 1606 may further include the input/output controller 1610, to receive and process inputs from a plurality of other devices, such as a keyboard, a mouse, or an electronic stylus. Similarly, the input/output controller 1610 further provides an output to a display screen, a printer, or another type of output device.

The mass storage device 1607 is connected to the CPU 1601 through a mass storage controller (not shown) connected to the system bus 1605. The mass storage device 1607 and an associated computer-readable medium provide non-volatile storage for the server 1600. That is, the mass storage device 1607 may include a computer-readable medium (not shown) such as a hard disk or a compact disc ROM (CD-ROM) drive.

In general, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), a flash memory or another solid-state storage technology, a CD-ROM, a digital versatile disc (DVD) or another optical storage, a magnetic cassette, a magnetic tape, or a magnetic disk storage or another magnetic storage device. A person skilled in the art may learn that the computer storage medium is not limited to the several types as mentioned. The system memory 1604 and the mass storage device 1607 may be collectively referred to as a memory.

According to various embodiments of the present disclosure, the server 1600 may further be connected, by using a network such as the Internet, to a remote computer on the network and run. That is, the server 1600 may be connected to a network 1612 by using a network interface unit 1611 connected to the system bus 1605, or may be connected to another type of network or a remote computer system (not shown) by using a network interface unit 1611.

The memory further includes at least one instruction, at least one program, a code set, or an instruction set. The at least one instruction, the at least one program, the code set, or the instruction set is stored in the memory and is configured to be executed by one or more processors to implement the virtual object control method.

In an exemplary embodiment, a computer device or a computing device is further provided, the term "computer device" is employed herein interchangeably with the term "computing device." The computer device may be a terminal or a server. The computer device includes a processor and a memory, the memory storing at least one instruction, at least one program, a code set, or an instruction set, the at least one instruction, the at least one program, the code set, or the instruction set being loaded and executed by the processor to implement the virtual object control method.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

An embodiment of the present disclosure further provides a computer-readable storage medium, storing at least one instruction, the at least one instruction being loaded and executed by a processor to implement the virtual object control method described in the embodiments.

An embodiment of the present disclosure further provides a computer program product or a computer program. The computer program product or the computer program includes computer instructions, the computer instructions being stored in a computer-readable storage medium. A processor of a computer device reads the computer instructions from the computer-readable storage medium, and executes the computer instructions, so that the computer device performs the virtual object control method provided in the optional implementations in the aspects.

A person skilled in the art should be aware that in the one or more examples, the functions described in the embodiments of the present disclosure may be implemented by using hardware, software, firmware, or any combination thereof. When implemented by using software, the functions can be stored in a computer-readable storage medium or can be used as one or more instructions or code in a computer-readable storage medium for transmission. The computer-readable storage medium includes a computer storage medium and a communication medium, where the communication medium includes any medium that enables a computer program to be transmitted from one place to another. The storage medium may be any available medium accessible to a general-purpose or dedicated computer.

The descriptions are merely optional embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A virtual object control method, applied to a terminal, the method comprising:
    displaying a battle interface, the battle interface including a first virtual object, at least one second virtual object, and a first control, the first virtual object and the at least one second virtual object being located in a virtual world and belonging to different camps, and the first control being configured to control the first virtual object to use a virtual prop to change target attribute values of other virtual objects, the at least one second virtual object being configured to be presented in a default manner;
    obtaining object information of the at least one second virtual object;
    determining a target virtual object from the at least one second virtual object based on the object information;
    in response to determining the target object from the at least one second virtual object, changing a presentation of the target virtual object from the default manner to a predetermined labeling manner;
    receiving a first trigger signal acting on the first control, wherein the first control includes a first automatic control region and a first active control region adjacent to and contacting the first automatic control region, no intersection existing between the first automatic control region and the first active control region;
    in response to a touch end position corresponding to the first trigger signal being located in the first automatic control region, determining that the first trigger signal meets an automatic control condition and controlling the first virtual object to use the virtual prop to change a target attribute value of the target virtual object; and
    in response to the touch end position corresponding to the first trigger signal being located in the first active control region, determining that the first trigger signal meets an active control condition, identifying, among the at least one second virtual object, a target second virtual object mapped to the touch end position as the actively-selected virtual object; and controlling the first virtual object to use the virtual prop to change a target attribute value of the actively-selected virtual object,
    wherein:
        determining the target virtual object comprises: prior to the first trigger signal being received, in response to determining that the object information of a candidate virtual object in the at least one second virtual object meets a preset condition, determining the candidate virtual object as the target virtual object;
        the target virtual object is changed to the predetermined labeling manner prior to receiving the first trigger signal.

2. The method according to claim 1, wherein determining the target virtual object from the at least one second virtual object comprises:
    obtaining first object information of the first virtual object and second object information of the at least one second virtual object in response to determining that the at least one second virtual object does not include an actively-selected virtual object, the actively-selected virtual object being a virtual object selected by using the first control, and object information being used for representing a state and a position of a virtual object;
    determining the target virtual object from the at least one second virtual object according to the first object information and the second object information; and
    labeling the target virtual object in a first predetermined manner.

3. The method according to claim 2, wherein the first object information includes a first position and a first range, the second object information includes a second position, the first position being a position in which the first virtual object is located in the virtual world, the second position being a position in which the second virtual object is located in the virtual world, and the first range being a use range of the virtual prop; and determining the target virtual object from the at least one second virtual object comprises:
    determining a second range according to the first range, the second range being larger than the first range;
    determining a second virtual object within the second range as a candidate virtual object according to the first position and the second position; and
    determining a candidate virtual object meeting a selection condition as the target virtual object, the selection condition including at least one of the following: having a shortest distance to the first virtual object, having a smallest target attribute value, and belonging to a target camp.

4. The method according to claim 2, wherein determining the target virtual object from the at least one second virtual object comprises:
    determining the actively-selected virtual object as the target virtual object in response to determining that the at least one second virtual object includes the actively-selected virtual object; and
    labeling the target virtual object in a second predetermined manner.

5. The method according to claim 1, wherein the battle interface further includes a second control, the second control being configured to control the first virtual object to cast a target skill to other virtual objects; and the method further comprises:
    controlling, in response to determining that a second trigger signal acting on the second control is received, the first virtual object to cast the target skill to the target virtual object.

6. The method according to claim 5, wherein the second control includes a second automatic control region and a second active control region, no intersection existing between the second automatic control region and the second active control region; and controlling the first virtual object to cast the target skill to the target virtual object comprises:
obtaining a skill casting rule of the target skill in response to determining that a touch end position corresponding to the second trigger signal is located in the second automatic control region; and
controlling, in response to determining that the target virtual object meets the skill casting rule, the first virtual object to cast the target skill to the target virtual object.

7. The method according to claim 1, further comprising: determining the target virtual object is from the at least one second virtual object in response to determining that the target attribute value of the target virtual object reaches an attribute value threshold.

8. The method according to claim 7, wherein that the target attribute value of the target virtual object reaches an attribute value threshold includes: the remaining hit points of the target virtual object reaching a hit point threshold, and a position of the target virtual object being outside a display range of the battle interface.

9. The method according to claim 1, wherein the at least one second virtual object that meets a present condition includes at least one of: the second virtual object being an virtual object conforming to an ordinary attack acts, a distance between the second virtual object and the first virtual object meeting a preset distance condition, a target camp of the second virtual object matching a preset camp, and preset attack priority of the at least one second virtual object.

10. The method according to claim 1, wherein changing the presentation of the target virtual object to the predetermined labeling manner further comprises at least one of:
highlighting an edge and attribute information bar of the target virtual object,
changing color information carried in the target virtual object,
adding a special label near corresponding to a character image of the target virtual object, and
displaying a ray directed from the first virtual object to the target virtual object.

11. The method according to claim 1, wherein the first automatic control region and the first active control region together form a circular region.

12. The method according to claim 11, wherein:
the first automatic control region and the first active control region are semi-circular regions taking opposite sides of the circular region.

13. The method according to claim 1, wherein:
the first automatic control region is circular, and the first active control region is an annular region surrounding the first automatic control region.

14. A virtual object control apparatus, comprising: a memory storing computer program instructions; and a processor coupled to the memory and configured to execute the computer program instructions and perform:
displaying a battle interface, the battle interface including a first virtual object, at least one second virtual object, and a first control, the first virtual object and the second virtual object being located in a virtual world and belonging to different camps, and the first control being configured to control the first virtual object to use a virtual prop to change target attribute values of other virtual objects, the at least one second virtual object being configured to be presented in a default manner;
obtaining object information of the at least one second virtual object;
determining a target virtual object from the at least one second virtual object based on the object information;
in response to determining the target object from the at least one second virtual object, changing a presentation of the target virtual object from the default manner to a predetermined labeling manner;
receiving a first trigger signal acting on the first control, wherein the first control includes a first automatic control region and a first active control region adjacent to and contacting the first automatic control region, no intersection existing between the first automatic control region and the first active control region;
in response to a touch end position corresponding to the first trigger signal being located in the first automatic control region, determining that the first trigger signal meets an automatic control condition and controlling the first virtual object to use the virtual prop to change a target attribute value of the target virtual object; and
in response to the touch end position corresponding to the first trigger signal being located in the first active control region, determining that the first trigger signal meets an active control condition, identifying, among the at least one second virtual object, a target second virtual object mapped to the touch end position as the actively-selected virtual object; and controlling the first virtual object to use the virtual prop to change a target attribute value of the actively-selected virtual object,
wherein:
determining the target virtual object comprises: prior to the first trigger signal being received, in response to determining that the object information of a candidate virtual object in the at least one second virtual object meets a preset condition, determining the candidate virtual object as the target virtual object;
the target virtual object is changed to the predetermined labeling manner prior to receiving the first trigger signal.

15. The apparatus according to claim 14, wherein determining the target virtual object from the at last one second virtual object comprises:
obtaining first object information of the first virtual object and second object information of the at least one second virtual object in response to determining that the at least one second virtual object does not include an actively-selected virtual object, the actively-selected virtual object being a virtual object selected by using the first control, and object information being used for representing a state and a position of a virtual object;
determining the target virtual object from the at least one second virtual object according to the first object information and the second object information; and
labeling the target virtual object in a first predetermined manner.

16. The apparatus according to claim 15, wherein the first object information includes a first position and a first range, the second object information includes a second position, the first position being a position in which the first virtual object is located in the virtual world, the second position being a position in which the second virtual object is located in the virtual world, and the first range being a use range of the virtual prop; and determining the target virtual object from the at least one second virtual object comprises:

determining a second range according to the first range, the second range being larger than the first range;

determining a second virtual object within the second range as a candidate virtual object according to the first position and the second position; and determining a candidate virtual object meeting a selection condition as the target virtual object, the selection condition including at least one of the following: having a shortest distance to the first virtual object, having a smallest target attribute value, and belonging to a target camp.

17. The apparatus according to claim 15, wherein determining the target virtual object from the at least one second virtual object comprises:

determining the actively-selected virtual object as the target virtual object in response to determining that the at least one second virtual object includes the actively-selected virtual object; and labeling the target virtual object in a second predetermined manner.

18. The apparatus according to claim 14, wherein the battle interface further includes a second control, the second control being configured to control the first virtual object to cast a target skill to other virtual objects; and the processor is further configured to execute the computer program instructions and perform:

controlling, in response to determining that a second trigger signal acting on the second control is received, the first virtual object to cast the target skill to the target virtual object.

19. A non-transitory computer-readable storage medium storing computer program instructions executable by at least one processor to perform:

displaying a battle interface, the battle interface including a first virtual object, at least one second virtual object, and a first control, the first virtual object and the at least one second virtual object being located in a virtual world and belonging to different camps, and the first control being configured to control the first virtual object to use a virtual prop to change target attribute values of other virtual objects;

obtaining object information of the at least one second virtual object;

determining a target virtual object from the at least one second virtual object based on the object information;

in response to determining the target object from the at least one second virtual object, changing a presentation of the target virtual object from the default manner to a predetermined labeling manner;

receiving a first trigger signal acting on the first control, wherein the first control includes a first automatic control region and a first active control region adjacent to and contacting the first automatic control region, no intersection existing between the first automatic control region and the first active control region;

in response to a touch end position corresponding to the first trigger signal being located in the first automatic control region, determining that the first trigger signal meets an automatic control condition and controlling the first virtual object to use the virtual prop to change a target attribute value of the target virtual object; and in response to the touch end position corresponding to the first trigger signal being located in the first active control region, determining that the first trigger signal meets an active control condition, identifying, among the at least one second virtual object, a target second virtual object mapped to the touch end position as the actively-selected virtual object; and controlling the first virtual object to use the virtual prop to change a target attribute value of the actively-selected virtual object, wherein:

determining the target virtual object comprises: prior to the first trigger signal being received, in response to determining that the object information of a candidate virtual object in the at least one second virtual object meets a preset condition, determining the candidate virtual object as the target virtual object;

the target virtual object is changed to the predetermined labeling manner prior to receiving the first trigger signal.

* * * * *